(12) United States Patent
Mori et al.

(10) Patent No.: US 8,125,881 B2
(45) Date of Patent: Feb. 28, 2012

(54) OPTICAL INFORMATION RECORDING MEDIUM, REPRODUCTION METHOD AND OPTICAL INFORMATION PROCESSING DEVICE USING THE SAME

(75) Inventors: Go Mori, Nara (JP); Masaki Yamamoto, Nara (JP); Hideharu Tajima, Ikoma-gun (JP); Nobuyuki Takamori, Kitakatsuragi-gun (JP)

(73) Assignee: Sharp Kabushiki Kaisha, Osaka (JP)

( * ) Notice: Subject to any disclaimer, the term of this patent is extended or adjusted under 35 U.S.C. 154(b) by 1331 days.

(21) Appl. No.: 11/197,661

(22) Filed: Aug. 3, 2005

(65) Prior Publication Data

US 2006/0028974 A1    Feb. 9, 2006

(30) Foreign Application Priority Data

Aug. 4, 2004  (JP) ................................ 2004-228434
Feb. 25, 2005 (JP) ................................ 2005-051673

(51) Int. Cl.
*G11B 3/70* (2006.01)
*G11B 5/84* (2006.01)
*G11B 7/26* (2006.01)
*G11B 7/24* (2006.01)
*B32B 3/02* (2006.01)

(52) U.S. Cl. .................... 369/284; 369/275.1; 428/64.4
(58) Field of Classification Search ................ 369/257.1
See application file for complete search history.

(56) References Cited

U.S. PATENT DOCUMENTS

| 4,006,378 A | 2/1977 | Silverstein et al. |
| 5,082,749 A * | 1/1992 | Carcia ............................ 428/699 |
| 5,246,758 A | 9/1993 | Matsui et al. |
| 5,477,520 A * | 12/1995 | Bartholomeusz ............. 369/100 |
| 5,696,747 A * | 12/1997 | Bartholomeusz ............. 369/100 |
| 6,187,406 B1 | 2/2001 | Ichihara et al. |
| 6,339,582 B1 | 1/2002 | Ichihara et al. |
| 6,606,291 B2 | 8/2003 | Ichihara et al. |
| 6,744,717 B2 | 6/2004 | Ichihara et al. |

(Continued)

FOREIGN PATENT DOCUMENTS

EP    1 484 757 A2    12/2004

(Continued)

OTHER PUBLICATIONS

M. Yamamoto, et al., "Super-Resolution Optical Disk with High Readout Stability Using a Zinc Oxide Thin Film," *Japanese Journal of Applied Physics*, vol. 43, No. 7B, pp. 4959-4963 (2004).

(Continued)

*Primary Examiner* — Mohammad Ghayour
*Assistant Examiner* — Carl Adams
(74) *Attorney, Agent, or Firm* — Edwards Wildman Palmer LLP; David G. Conlin; David A. Tucker

(57) ABSTRACT

An optical information recording medium of the present invention, a reproduction method using the optical information recording medium, and an optical information processing device using the optical information recording medium, each of which optically reproduces recorded information by irradiating a light beam, include: a substrate on which a bumpy pit and/or groove corresponding to the recorded information or a recording layer is formed; and a temperature responsive layer whose optical property (transmissivity) in a wavelength of the light beam varies in response to temperature rise caused by irradiation of the light beam. The optical information recording medium can surely reproduce information, which has been recorded in a high density manner, with high accuracy.

11 Claims, 9 Drawing Sheets

U.S. PATENT DOCUMENTS

| | | |
|---|---|---|
| 6,790,502 B1 | 9/2004 | Yamamoto et al. |
| 6,961,300 B2 * | 11/2005 | Cheong et al. ............. 369/275.1 |
| 6,965,556 B1 * | 11/2005 | Kikukawa et al. ............ 369/284 |
| 6,996,052 B1 * | 2/2006 | Mizuno et al. ............. 369/275.1 |
| 7,436,755 B2 * | 10/2008 | Takamori et al. .......... 369/275.1 |
| 2003/0035360 A1 | 2/2003 | Shinotsuka et al. |
| 2004/0032822 A1 | 2/2004 | Tsai et al. |
| 2004/0247815 A1 | 12/2004 | Takamori et al. |
| 2004/0264355 A1 * | 12/2004 | Takamori et al. .......... 369/275.2 |
| 2005/0018590 A1 * | 1/2005 | Inoue et al. ................ 369/275.2 |
| 2005/0117505 A1 | 6/2005 | Takamori et al. |
| 2005/0207328 A1 | 9/2005 | Yamamoto et al. |
| 2005/0213487 A1 | 9/2005 | Yamamoto et al. |

FOREIGN PATENT DOCUMENTS

| | | |
|---|---|---|
| JP | 52-44082 A | 4/1977 |
| JP | 05-012673 | 1/1993 |
| JP | 05-012715 | 1/1993 |
| JP | 10-320857 | 12/1998 |
| JP | 11-273148 A | 10/1999 |
| JP | 2001-101707 A | 4/2001 |
| JP | 2003-091875 A | 3/2003 |
| JP | 2004-014093 | 1/2004 |
| WO | WO-01/27689 A1 | 4/2001 |
| WO | WO-02/058060 A1 | 7/2002 |
| WO | WO-03/075268 A1 | 9/2003 |

OTHER PUBLICATIONS

A. Wang et al, "Indium-cadmium-oxide Films Having Exceptional Electrical Conductivity and Optical Transparency: Clues for Optimizing Transparent Conductors", PNAS, Jun. 19, 2001, vol. 98, No. 13, pp. 7113-7116.

S. Burachas et al, "Influence of Variable Tungsten Valency on Optical Transmittance and Radiation Hardness of Lead Tungstate (PWO) Scintillation Crystals", Nuclear Instruments and Methods in Physics Research, A 505 (2003) pp. 656-662.

S, Sebastian et al, "Optical Properties of $60B_2O_3$-$(40-x)$PbO—$_x$MCl$_2$ and $50B_2O_3$—$(50-x)$PbO—$_x$MCl$_2$ (M = Pb, Cd) Glasses" *Bull*. Mater. Sci., vol. 27, No. 2, Apr. 2004, pp. 207-212.

J. Domaradzki et al, "Optical and Structural Characterization of Eu and Pd-Doped $TiO_2$ Thin Films", Proceedings of the Symposium of Photonics Technologies for $7^{th}$ Framework Program Wroclaw Oct. 12-14, 2006.

* cited by examiner

33a: HIGH TEMPERATURE PORTION
(CHANGING STATE REGION)

33: REPRODUCTION BEAM SPOT

33b: LOW TEMPERATURE PORTION
(INITIAL STATE REGION)

MOVING DIRECTION OF REPRODUCTION BEAM SPOT

OPTICAL INFORMATION RECORDING MEDIUM, REPRODUCTION METHOD AND OPTICAL INFORMATION PROCESSING DEVICE USING THE SAME

This Nonprovisional application claims priority under 35 U.S.C. §119(a) on Patent Application No. 2004/228434 filed in Japan on Aug. 4, 2004 and Patent Application No. 2005/051673 filed in Japan on Feb. 25, 2005, the entire contents of which are hereby incorporated by reference.

FIELD OF THE INVENTION

The present invention relates to an optical information recording medium, a reproduction method and an optical information processing device using the same. In more detail, the present invention relates to (i) an optical information recording medium, such as an optical disc or the like, which optically reproduces or records/reproduces information with a light beam such as a laser beam, wherein a layer whose optical property changes corresponding to temperature is provided so as to improve recording density, (ii) a reproduction method using the optical information recording medium, and (iii) an optical information processing device using the optical information recording medium.

BACKGROUND OF THE INVENTION

With digitalization of information society, a writable medium is required to record/reproduce information at high density. In order to improve a recording capacity, various mediums have been arranged as a so-called writable optical information recording medium.

Furthermore, in order to realize high density recording/reproducing, for example, there have been performed the following trials: (i) a wavelength of a recording/reproducing laser beam is made shorter; (ii) a numerical aperture (NA) of an objective lens for converging a laser beam onto an optical information recording medium is increased; (iii) a recording layer of the optical information recording medium is multi-layered; (iv) a mask layer (referred to also as an optical shutter layer) for partially shielding light having an original spot size is formed on the optical information recording medium so as to substantially reduce an optical spot diameter of the laser beam; and the like.

The method in which the mask layer is formed on the optical information recording medium so as to substantially reduce the spot diameter is disclosed, for example, in Patent Document 1 (Japanese Unexamined Patent Publication No. 12673/1993 (Tokukaihei 5-12673)(Publication date: Jan. 22, 1993)) and Patent Document 2 (Japanese Unexamined Patent Publication No. 12715/1993 (Tokukaihei 5-12715)(Publication date: Jan. 22, 1993): the corresponding U.S. Pat. No. 5,246,758(A1)).

Specifically, Patent Document 1 discloses an optical disc device which records/reproduces information in accordance with reflectance variation caused by bumpy pits formed on a substrate of an optical disc, wherein a temperature-dependent optical shutter layer is formed. The temperature-dependent optical shutter layer is arranged so that: an upper portion (a disc surface to which a laser beam is irradiated from the objective lens) of an information recording/reproducing layer which records a signal absorbs a reproduction beam having a certain wavelength at a normal temperature, and stops absorbing the reproduction beam having the foregoing wavelength due to temperature rise caused by the reproduction beam power, and absorbs the reproduction beam having the foregoing wavelength again due to temperature drop after the reproduction beam passes through the reproduction light-converged spot.

Further, Patent Document 1 discloses an optical disc device which records/reproduces information in accordance with reflectance variation caused by a phase change of a recording material, wherein a temperature-dependent optical shutter layer is formed. The temperature-dependent optical shutter is arranged so that: an upper portion (a disc surface to which a laser beam is irradiated from the objective lens) of an information recording/reproducing layer which records a signal absorbs a reproduction beam having a certain wavelength at a normal temperature, and stops absorbing the reproduction beam having the foregoing wavelength due to temperature rise caused by the reproduction beam power, and absorbs the reproduction beam having the foregoing wavelength again due to temperature drop after the reproduction beam passes through the reproduction light-converged spot.

Patent Document 2 discloses an optical recording medium having a recording film provided on a substrate, wherein an optical shutter is provided on the recording film so as to be positioned before a point receiving a reading light beam or a recording light beam. The optical shutter layer includes as a main component a thermochromism material which is in a coloring state which prevents transmission of the reading light beam before irradiation of the reading light beam and partially uncolors a central portion of a reading light beam receiving portion (light transmittance state) with temperature rise of the reading light beam receiving portion.

According to these techniques, in the optical information recording medium having bumpy pits or a recording film provided on a substrate, the mask layer is provided on the pits or the recording film so as to be positioned in the light receiving side. Generally, the mask layer is made of thermochromic material or phase change material. The central portion of the light receiving portion of the mask layer receives a large quantity of light such as the reading light beam, so that temperature of the central portion rises due to the light irradiation. Thus, the central portion of the light receiving portion of the mask layer optically or thermally changes, and partially uncolors, so as to be in a light transmittance state. Meanwhile, in a less-light receiving portion positioned in a periphery of the light receiving portion or in a portion receiving no light, temperature less rises due to irradiation of less light or temperature does not rise at all, so that optical transmissivity becomes small. Thus, light is shielded.

As a result, a substantial spot size corresponds to a size of the central portion of the light receiving portion, so that it is possible to reduce the substantial spot size. That is, in the mask layer, light is allowed to pass through only a portion whose optical intensity distribution is high, so that a spot diameter of the incident light is substantially reduced, thereby recording/reproducing information with a smaller pit. As a result, it is possible to realize high density recording/reproducing with respect to the optical information recording medium.

Patent Document 3 (Japanese Unexamined Patent Publication No. 14093/2004 (Tokukai 2004-14093)(Publication date: Jan. 15, 2004): the corresponding US Publication No. U.S. 2004/0032822 A1) discloses a playback-only optical disc which includes a zinc oxide thin film using near-field light.

The zinc oxide layer is positioned in the backside of the reflection layer in view of the light receiving side. Further, the near-field light is used, so that the zinc oxide layer is comparatively thin (5 nm to 100 nm). Thus, it is necessary to provide a transparent dielectric material film between the reflection layer and the zinc oxide layer so that these layers are not positioned adjacent to each other.

Patent Document 4 (Japanese Unexamined Patent Publication No. 320857/1998 (Tokukaihei 10-320857)(Publication date: Dec. 4, 1998): the corresponding U.S. Pat. No. 6,187,406 B1, U.S. Pat. No. 6,606,291 B2, U.S. Pat. No. 6,744,717 B2) discloses an arrangement in which: zinc oxide is included as a material used in an optical recording medium for super-resolution reproduction, and a band gap is utilized.

However, it is disclosed that: this technique utilizes a Stark effect (electronic excitation and absorption saturation) of a semiconductor so as to obtain a super-resolution effect, and it is most preferable that a wavelength corresponding to a band gap is larger than a reproduction wavelength. Further, increase in the transmissivity in a photon mode is utilized.

Each of the mask layers (optical shutter layers) recited in Patent Document 1 and Patent Document 2 is made of thermochromic material or phase change material. The foregoing material exhibits a mask effect by melting when temperature rises to a certain level. A material in a melting state has higher fluidity, so that a composition and a shape thereof in an initial state are likely to change. Thus, in the optical information recording medium having the mask layer which exhibits the mask effect when temperature rises to a certain level, in case where information is repeatedly recorded and reproduced, the mask effect gradually drops due to deviation in the composition and the shape of the mask layer. Thus, the foregoing optical information recording medium raises such a problem that the mask effect becomes substantially lost due to several thousands repetitions of the recording/reproducing operation. Thus, durability of the conventional optical information recording medium is insufficient.

Further, Patent Document 1 has such recitation that "the temperature-dependent optical transmissivity variable medium is made of a polymer material or an organic material for example, . . . and the optical transmissivity of the material becomes higher in a high temperature region for example. The transmissivity variation may be such that melting of the material raises the optical transmissivity, or the transmissivity variation may be based on variation in regularity of a molecular arrangement like a liquid crystal material. Further, it may be so arranged that: like the phase change material, crystallization caused by heating and cooling substances such as chalcogenide adhering in an amorphous state results in variation of the optical transmissivity."

However, this recitation fails to specifically recite an example of a material whose optical transmissivity becomes high in a high temperature range. Thus, the invention of Patent Document 1 cannot be realized by person with ordinary skill in the art in accordance with a technique recited in Patent Document 1 and common techniques at the time of publication of Patent Document 1.

The optical disc recited in Patent Document 3 raises such a problem that: the near-field light is utilized, so that relatively large laser power is required, which results in a low ratio of light-signal conversion.

Further, the optical recording medium recited in Patent Document 4 has a low transmissivity (theoretically 0) with respect to a reproduction optical wavelength in an unexcited state, so that this arrangement is not advantageous for a transmissive multi-layered structure. Further, the optical recording medium recited in Patent Document 4 raises such a problem that: it is necessary to make the excitation wavelength and the reproduction wavelength correspond to each other and it is difficult to control this operation.

SUMMARY OF THE INVENTION

In view of a condition under which high density recording/reproducing is required, the present invention was completed, and an object of the present invention is to provide (i) an optical information recording medium which allows high density information to be accurately reproduced without fail, (ii) a method for recording the information, and (iii) a method for reproducing the information.

In order to achieve the foregoing object, the optical information recording medium of the present invention includes a temperature responsive layer whose optical property in a wavelength of a light beam (wavelength=$\lambda r$ (nm)) changes in response to temperature rise caused by irradiation of the light beam, wherein $\lambda r-100<\lambda a<\lambda r$ where an optical absorption edge wavelength of the temperature responsive layer is $\lambda a$ (nm).

According to the arrangement, when a reproducing or recording light beam is irradiated, the optical property in the wavelength of the light beam, e.g., the transmissivity drops or rises at the temperature responsive layer's portion where temperature has risen due to the irradiation of the light beam, and the optical property is kept at other portion free from any temperature rise and the temperature remains low.

Thus, according to the foregoing arrangement, it is possible to selectively reproduce or record information from or onto a region whose size is smaller than a spot size of the reproducing or recording light beam. Therefore, the foregoing arrangement brings about such effects that: it is possible to surely reproduce information, recorded in a high density manner, with high accuracy, and it is possible to surely record information in a high dense manner with high accuracy.

Further, under such condition that $\lambda r-100<\lambda a<\lambda r$, the wavelength of the light beam is longer than the optical absorption edge wavelength and the optical absorption edge wavelength is in proximity to the wavelength of the light beam. Thus, a transmissivity spectrum in the wavelength of the light beam drastically changes.

In case where the optical absorption edge shifts to the large wavelength size or the small wavelength side due to the temperature rise, the transmissivity spectrum in the wavelength of the light beam drastically changes even when the optical absorption edge slightly shifts. As a result, the optical property, e.g., the transmissivity drastically changes. That is, the optical property more greatly changes than the optical absorption edge shifts, so that it is possible to enhance the foregoing effects.

Further, the temperature responsive layer of the optical information recording medium arranged in the foregoing manner can be made of a material such as metal oxide which does not melt by temperature rise at the time of recording or reproducing. Thus, the foregoing arrangement brings about such effects that: the mask effect does not drop even when information is repeatedly recorded and reproduced, and the superior durability can be realized.

For a fuller understanding of the nature and advantages of the invention, reference should be made to the ensuing detailed description taken in conjunction with the accompanying drawings.

BRIEF DESCRIPTION OF THE DRAWINGS

FIG. 3(b) is a plan view showing reflectance distribution in the reproduction beam spot of the temperature responsive reflection layer so as to illustrate the mask effect brought about by the temperature responsive reflection layer.

DESCRIPTION OF THE EMBODIMENTS

Embodiment 1

The following description will explain one embodiment of an optical information recording medium of the present invention with reference to FIG. 1 to FIG. 8, FIG. 11, and FIG. 12.

First, a main structure of a recording/reproducing device (optical information processing device) which can record/reproduce information onto/from the optical information recording medium of the present invention is described as follows.

The recording/reproducing device includes a laser light source, light collecting optical means, relative motion means, photoelectric conversion means, servo means, address information detection means, reproduction signal demodulation circuit, and the like.

As the laser light source, it is possible to use a semiconductor laser device or the like which emits light whose wavelength is 405 nm for example. The light collecting optical means causes laser light emitted from the laser device to be in a beam state and collects the light onto the optical information recording medium, and includes optical parts such as a light collecting lens, a beam splitter, and the like. The relative motion means causes the light collecting optical means and the optical information recording means to perform relative motion, and is constituted of a linear actuator or a swing arm. The motion includes at least one of (i) a motion in which the optical information recording medium rotates or moves in parallel and (ii) a motion in which the light collecting lens included in the light collecting optical means moves at right angle with respect to a light axis of the light collecting lens. The photoelectric conversion means converts a level of light reflected from the optical information recording medium into an electric signal. The servo means performs auto-focus and tracking with respect to the laser light. The address information detection means detects address information in accordance with an electric signal obtained by reproducing an address information mark provided on the optical information recording medium. The reproduction signal demodulation circuit reproduces recorded information in accordance with the light reflected from the optical information recording medium.

Of these members, the laser light source, the light collecting optical means, the photoelectric conversion means, and the servo means are stored in an optical head which performs relative motion with the optical information recording medium by means of the relative motion means. The laser light source and the photoelectric conversion means can be stored in a case different from a case storing the light collecting optical means.

Further, in the recording/reproducing device, it is preferable to further provide means for adjusting an angle between the collected laser light and the optical information recording medium. According to this arrangement, it is possible to prevent the optical spot from being deteriorated by aberration.

Figure 11:
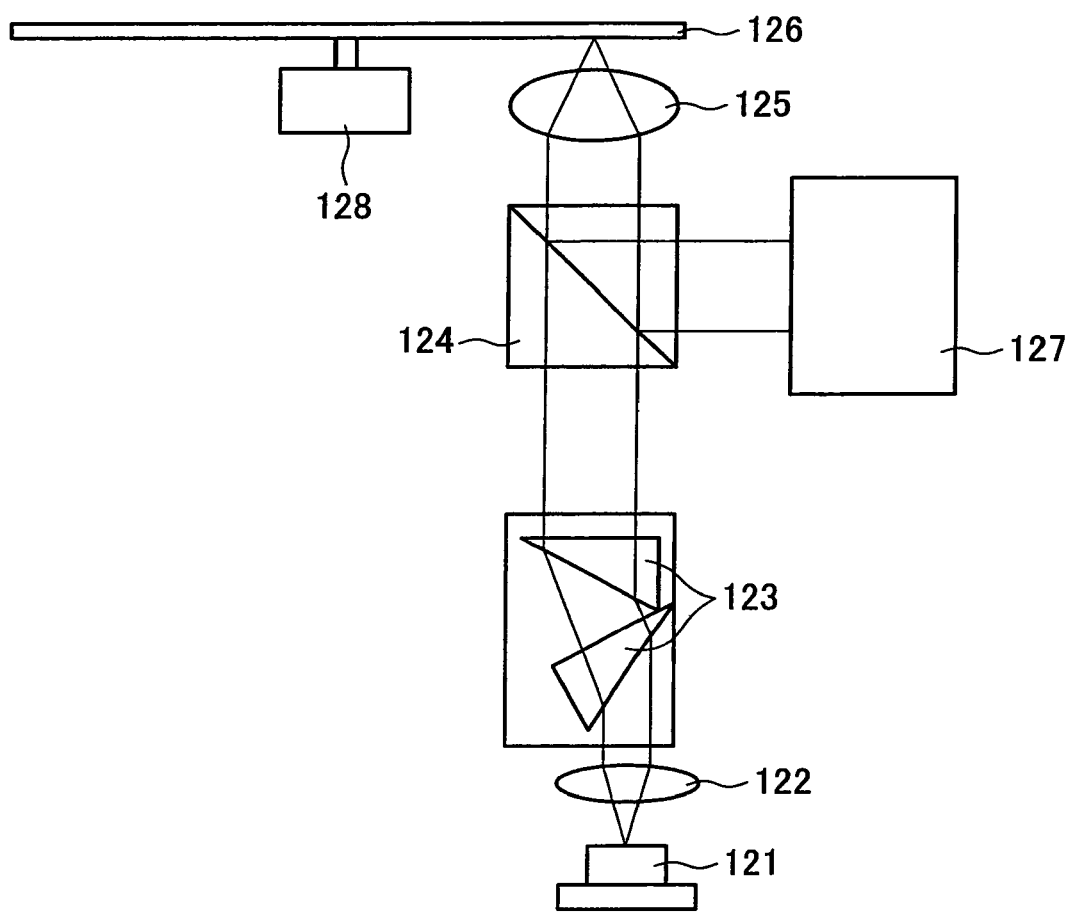
FIG. 11 is a schematic showing an optical system of a recording/reproducing device which can record/reproduce information by using the optical information recording medium of the present invention.

FIG. 11 shows an arrangement of a general optical system in case where the optical information recording medium installed on the recording/reproducing device as an optical head is a disc-shape optical disc. The optical system includes a semiconductor laser 121, a collimating lens 122, a beam adjusting prism 123, a beam splitter 124, an objective lens 125, and a detection optical system 127.

The laser light from the semiconductor laser 121 serving as a light source is converted into substantially parallel light by the collimating lens 122, and the beam adjusting prism 123 adjusts the optical intensity distribution into substantially a circular shape. After the substantially circular parallel light is transmitted through the beam splitter 124, the objective lens 125 collects the parallel light onto the optical information recording medium 126. This reflected light is split by the beam splitter 124, and is led to the detection optical system 127.

The spindle motor 128 rotates the optical information recording medium 126 so as to cause the optical spot to scan the optical information recording medium 126. The detection optical system 127 identifies a signal in accordance with (i) the reflected light variation in a polarization direction and (ii) reflected light intensity variation, so as to read out a recording mark recorded on the optical information recording medium 126. At the same time, the detection optical system 127 detects (a) a focus deviation signal indicative of how the optical spot deviates from the focus of the optical information recording medium 126 and (b) a track deviation signal indicative of how the optical spot deviates from the track of the optical information recording medium 126, and feedbacks the detection result to a driving system of the objective lens 125, thereby correcting positional deviation of the optical spot. A numerical aperture (NA) of the objective lens is set to 0.65 for example.

In the optical information recording device, it is desirable that, as the optical information recording medium 126, both the optical information recording medium of the present invention which adopts the super-resolution medium technique and a general optical information recording medium which does not adopt the super-resolution medium technique can record/reproduce information. Thus, the optical information recording/reproducing device is arranged so that: a gain of the detector, a reproduction light intensity, a recording light intensity, a recording waveform, a rotational frequency of the optical information recording medium are respectively switched between the case of the optical information recording medium of the present invention and the case of the general optical information recording medium. Note that, these values can be electrically controlled, so that it is not necessary to greatly change the optical system unlike a device for recording/reproducing information merely on/from the general medium.

Figure 1:
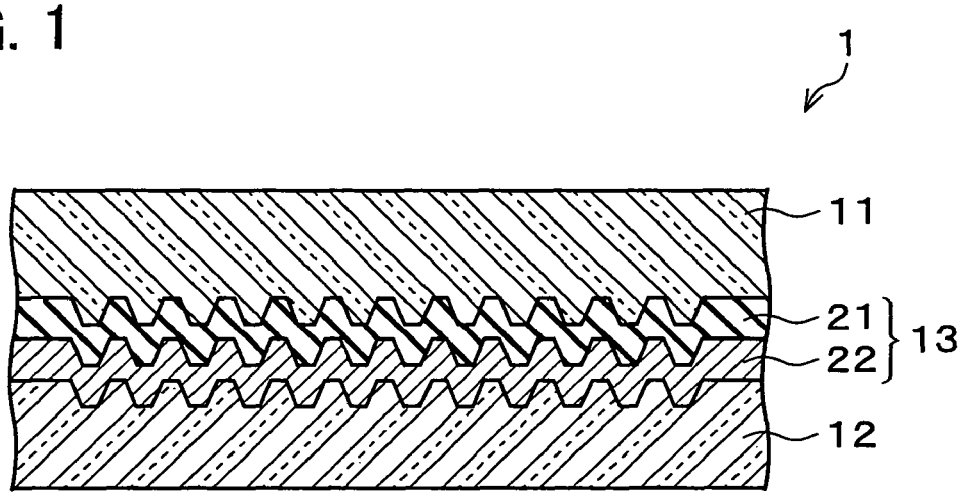
FIG. 1 is a partial cross sectional view showing an essential portion of an optical information recording medium according to one embodiment of the present invention.
Figure 2:
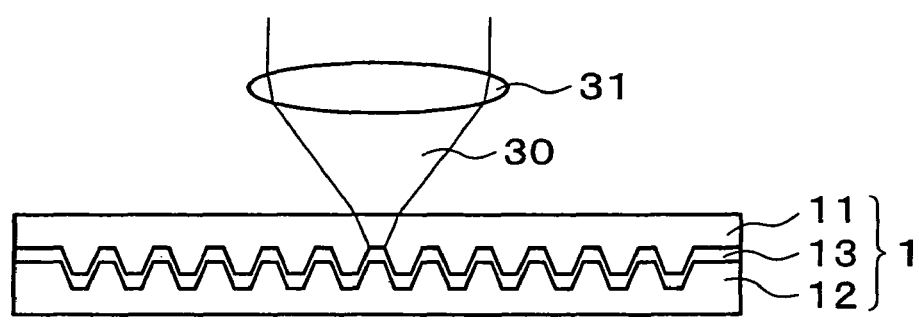
FIG. 2 is a cross sectional view schematically showing an optical information recording medium according to one embodiment of the present invention.
Figure 3:
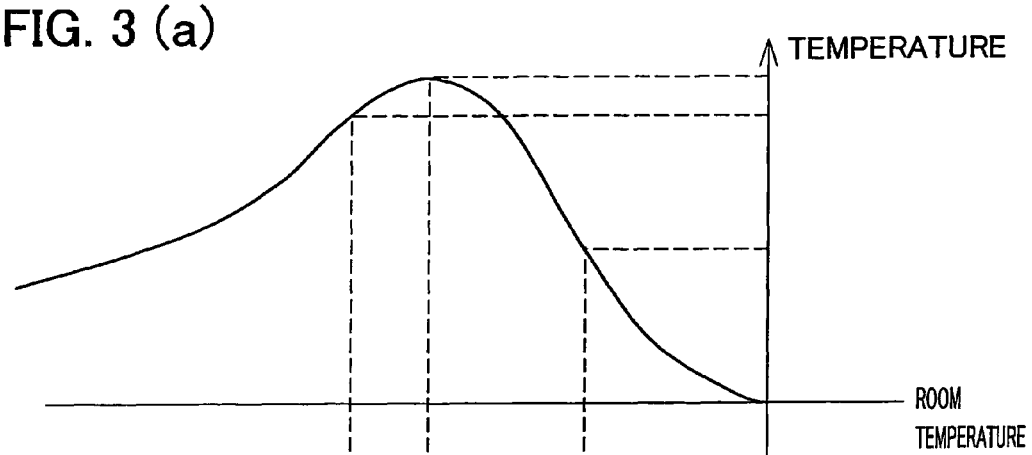
FIG. 3(*a*) is a graph showing temperature distribution in a reproduction beam spot of a temperature responsive reflection layer so as to illustrate a mask effect brought about by the temperature responsive reflection layer.
Figure 3:
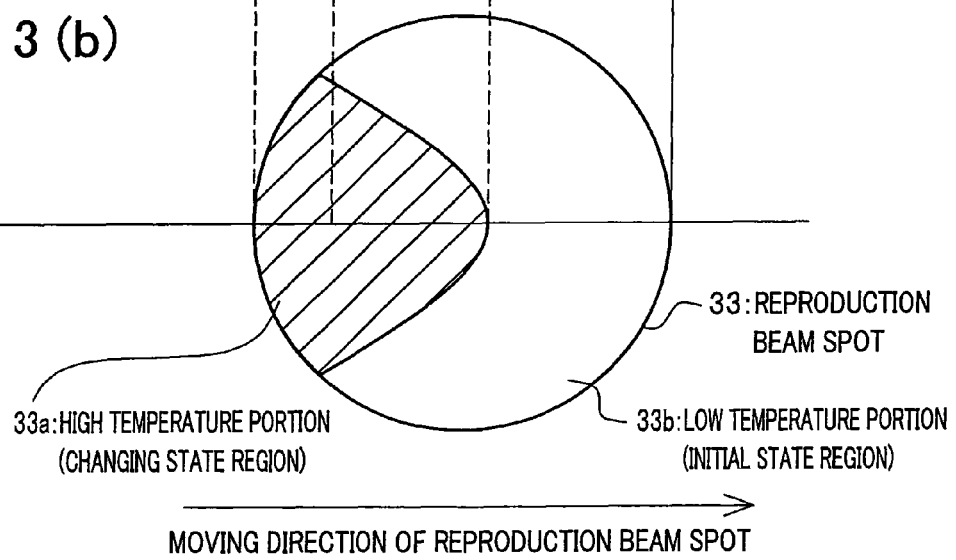

As shown in FIG. 1 and FIG. 2, the optical information recording medium of the present embodiment is a playback-only optical information recording medium 1, and is arranged so that: a transparent resin layer 11, a temperature responsive reflection layer 13, and a substrate 12 are formed in this order from a side on which a reproduction beam 30 serving as a playback-only light beam is incident. That is, the optical information recording medium 1 is arranged so that: the temperature responsive reflection layer 13 is formed on the substrate 12, and the transparent resin layer 11 is formed thereon, and a reproduction beam 30 is projected from the transparent resin layer 11 via the temperature responsive reflection layer 13 so as to be incident on an internal surface (surface on the side of the temperature responsive reflection layer 13) of the substrate 12.

The transparent resin layer 11 is transparent (optically transmissive) at least in a wavelength of the reproduction beam 30, and it is necessary that the transparent resin layer 11 does not prevent the reproduction beam from entering. Thus, it is possible to arrange the optical information recording medium 1 which allows the reproduction beam 30 to enter from the side of the transparent resin layer 11. A material for the transparent resin layer 11 is not particularly limited. Examples of the material include: a thermoplastic transparent resin (plastic) such as polycarbonate, amorphous polyolefin, thermoplastic polyimide, PET (polyethylene terephthalate), PEN (polyethernitryl), and PES (polyethersulfone); a thermosetting transparent resin such as thermosetting polyimide and ultraviolet curing acrylate resin; and a combination thereof.

Generally, it is preferable to arrange the transparent resin layer 11 so as to have a thickness ranging from 1 μm to 100 μm. Further, the transparent resin layer 11 may have a thickness ranging from 0.1 mm to 1.2 mm. In this case, it is possible to give appropriate strength to the optical information recording medium. Note that, instead of the transparent resin layer 11, it is possible to use a layer or the like which is made of other transparent material such as glass or material obtained by combining glass and a transparent resin with each other. In this case, it is appropriate to set a thickness of the layer to be in a range of 0.1 mm to 1.2 mm.

It is necessary that the substrate 12 can give the optical information recording medium 1 an appropriate strength. An optical property of a material constituting the substrate 12 is not particularly limited, but may be transparent or opaque. Examples of the material constituting the substrate 12 include: a thermoplastic transparent resin such as glass, polycarbonate, amorphous polyolefin, thermoplastic polyimide, PET, PEN, and PES; a thermosetting transparent resin such as thermosetting polyimide and ultraviolet curing acrylate resin; metals; and a combination thereof.

A bumpy (patterned indented) pit and/or a guiding groove corresponding to the recorded information is formed on an internal surface (surface on the side of the temperature responsive reflection layer 13) of the substrate 12. Both the pit and the groove may be formed, or either the pit or the groove may be formed.

A thickness of the substrate 12 is not particularly limited, but it is appropriate to set the thickness to be in a range of 0.1 mm to 1.2 mm. Further, a pitch of the pit ranges from 0.3 μm to 1.6 μm, and a vertical interval of the pit ranges from 30 nm to 200 nm. Further, it is appropriate that the guiding groove has a pitch ranging from 0.3 μm to 1.6 μm and a depth ranging from 30 nm to 200 nm.

The temperature responsive reflection layer 13 is formed on the substrate 12, and the temperature responsive reflection layer 13 drops the transmissivity in the wavelength of the reproduction beam 30 in response to temperature rise caused by irradiation of the reproduction beam 30. As shown in FIG. 1, the temperature responsive reflection layer 13 is arranged so that: the temperature responsive layer 21 and the reflection layer 22 are laminated in this order from the light receiving side, that is, from the side of the transparent resin layer 11.

The temperature responsive layer 21 is made of translucent material whose transmissivity changes in a reversible manner due to a temperature change and whose transmissivity in the wavelength of the reproduction beam drops in response to temperature rise. As the foregoing material, it is appropriate to use a material which causes the transmissivity of the temperature responsive layer 21 to greatly change in a specific wavelength range when the temperature rises, specifically, a material which causes the optical transmissivity of the temperature responsive layer 21 to drops within a range of 10% to 90% when the temperature rises from 20° C. to 180° C. As the foregoing material, a thermochromism substance can be used. The thermochromism substance chemically brings about a structural change by absorbing heat, so that its transmissivity changes. Specific examples of the thermochromism substance whose transmissivity drops due to the temperature change include: an inorganic thermochromism substance such as metal oxide; and an organic thermochromism substance such as (i) a substance obtained by adding alkali to lactone, fluoran, or the like, and (ii) a substance obtained by adding organic acid to leuco or the like.

Among them, the metal oxide whose band gap changes due to temperature so that the transmissivity in the optical absorption edge wavelength changes is superior in durability since a composition and a shape of the metal oxide hardly change even when its structural change chemically brought about by the temperature change is repeated. Thus, it is preferable to use the metal oxide. Specific examples of the metal oxide include ZnO, $SnO_2$, $CeO_2$, $NiO_2$, $In_2O_3$, $TiO_2$, $Ta_2O_5$, $VO_2$, $SrTiO_3$, and the like. Among them, it is particularly preferable to use ZnO (zinc oxide).

The thickness of the temperature responsive layer 21 can be adjusted depending on a material used therein, and it is appropriate to set the thickness to be in a range of 5 nm to 800 nm. When the thickness of the temperature responsive layer 21 is sufficiently large (100 nm or more), multiple interference can be more sufficiently used, so that it is possible to more greatly change the transmissivity due to the temperature rise. As described later, the thickness of the temperature responsive layer 21 is preferably over 100 nm, more preferably 120 nm or more, still more preferably 150 nm or more.

While, when the thickness of the temperature responsive layer 21 is too large, deposition makes the layer surface blunter than the bumpy shape of the pit or the like, so that such thickness results in disadvantage in terms of a process and cost. From the foregoing view point, the thickness of the temperature responsive layer 21 is preferably 300 nm or less, more preferably 280 nm or less, still more preferably 250 nm or less. Thus, it is preferable that the temperature responsive layer 21 is a ZnO (zinc oxide) having a thickness of 100 nm or more and 300 nm or less.

That is, it is more preferable that the thickness of the temperature responsive layer 21 is larger since the optical multiple interference can be more sufficiently utilized. However, when the thickness is too large, the bumpy shape such as the pit and the groove on the substrate cannot be kept on the surface of the thin layer, so that the bumpy shape becomes blunt. Moreover, when there is a shape difference between a bottom face and a surface of the bumpy thin layer serving as a multiple reflective face in utilizing the optical multiple interference, the difference results in a noise in the signal quality. Another disadvantage is such that: in case of forming a thin layer having a large thickness and forming another thick layer on the previously formed thin layer, the additional thin layer is formed on the surface shape of the previously formed thin layer, that is, the additional thin layer is formed on the bumpy shape which has been made blunt, so that such film formation results in a noise in a signal. Thus, it is preferable that the thickness of the temperature responsive layer 21 ranges from 150 nm to 250 nm.

Further, in case of using the near-field light like Patent Document 3, 100 nm is too large to practically use the near-field light. The technical reason thereof is as follows. According to Non-Patent Document ("Basics of Near-field light— New Optics for Nanotechnology" 153-154 p, written by Motoichi Otsu, Kiyoshi Kobayashi, published by Ohmsha on Jan. 5, 2003), planate near-field light recited in Patent Document 3 is referred to also as evanescent light (evanescent wave), and is obtained as a result of exuding or leakage of general propagated light. In case where light is entirely reflected by an interface between two mediums different from each other in terms of a refraction, evanescent light occurs from a rear side of the interface (entire reflection face), and the evanescent light exudes only to a region which is as narrow as a wavelength of light.

Here, "100 nm is too large to practically use the near-field light" means that it is not necessarily possible to obtain more effects as the thin layer of zinc oxide is thicker.

The evanescent light is represented by the following equation.

$$I(r) = I0 \exp(-2r/\Lambda)$$

As apparent from the equation, as r indicative of a distance from the interface becomes larger, the optical intensity significantly drops exponentially. $\Lambda$ is indicative of an exuding thickness of an amplitude of an electric field of the near-field light, and is equal to or smaller than the wavelength as described above.

The zinc oxide thin layer recited in Patent Document 3 generates a local near-field optical effect, so that it can be assumed that: as the thickness becomes larger, the distance of "r" becomes larger, influence exerted by the local near-field optical effect decreases exponentially. That is, it is not necessarily possible to obtain more effects as the zinc oxide thin layer becomes thicker.

Further, according to Patent Document 3, the local near-field optical effect is generated, but the near-field light occurs in the interface in case of the entire reflection. Moreover, it is generally known that: light is guided by a guiding path and is transmitted from a minute opening (generally, 100 nm or less), and the near-field light occurs outside of the minute opening. In any case, according to an arrangement of a general optical disc disclosed in Patent Document 3, an angle of incident light is substantially 0, and a quantity of transmitted light is large when light is incident on substantially transparent zinc oxide, so that the entire reflection state hardly occurs and a condition in this case is close to a minute opening state. Patent Document 3 recites only such a condition that zinc oxide generates the local near-field optical effect, and does not specifically disclose which interface generates the near-field optical effect and how the near-field optical effect is generated. Furthermore, Patent Document 3 does not disclose any basis on which it is preferable to set the layer thickness to be in a range of 5 nm to 100 nm.

Note that, Patent Document 2 (Tokukaihei 5-12715) lists examples of only an organic material used as the thermochromism substance. All these examples lack in thermal stability and are not practical in terms of durability in repetitive reproduction. The temperature responsive layer 21 made of an inorganic thermochromism substance such as metal oxide is so characterized by being free from any instability.

Further, Patent Document 3 (Tokukai 2004-14093) discloses a playback-only optical disc using zinc oxide nano thin layer based on the near-field light, but the zinc oxide layer is positioned in the rear side of the reflection layer in view of the light receiving side. Thus, the playback-only optical disc recited in Patent Document 3 is arranged differently from the present invention in which the zinc oxide layer is positioned in the front side of the reflection layer in view of the light receiving side. Further, the playback-only optical disc disclosed in Patent Document 3 utilizes the near-field light, so that the zinc oxide layer is relatively thin (5 nm to 100 nm) and requires a transparent dielectric layer between the reflection layer and the zinc oxide layer so that both layers are not adjacent to each other.

In contrast, the optical information recording medium of the present invention uses optical multiple interference and a shift of a band gap of a semiconductor, and the zinc oxide layer may be adjacent to the reflection layer, and it is preferable that the zinc oxide layer is relatively thick (100 nm or more, preferably, over 100 nm) since the optical multiple interference is used. That is, the present invention and the invention recited in Patent Document 3 are identical with each other in that the optical disc uses the zinc oxide layer, but they are different from each other in terms of a principle and an arrangement.

It is preferable that the reflection layer 22 is constituted of a metal layer having a high reflectance. Specific examples of the metal layer having a high reflectance include an Al layer, an Au layer, an Ag layer, a Cu layer, etc., and a layer made of alloy containing any of the foregoing layers. Further, not only metal but also a semiconductor may be used as long as the semiconductor gives a reflectance enough to reproduce information. Specific examples thereof include an Si layer and a Ge layer. The thickness of the reflection layer 22 is not particularly limited, but it is possible to adjust the thickness so as to realize a desired reflectance. For example, the thickness of the reflection layer 22 ranges from 5 nm to 100 nm.

The foregoing description explained the temperature responsive layer 21 and the reflection layer 22 as components of the temperature responsive reflection layer 13. However, the temperature responsive reflection layer 13 does not necessarily requires the reflection layer 22 as long as the two layers allow the refraction to be changed in response to a temperature change and allow the light to be reflected. Specifically, in case where the refraction of the temperature responsive layer 21 is high and a refraction difference from a layer or a resin adjacent to the temperature responsive layer 21 gives the reflectance enough to reproduce information, the reflection layer 22 may be omitted.

According to such an arrangement, it is possible to realize the playback-only optical information recording medium 1, such as so-called CD Compact Disc), CD-ROM (Compact Disc Read Only Memory), DVD (Digital Versatile Disc), DVD-ROM (Digital Versatile Disc Read Only Memory), which has no writable recording layer.

Next, a method for reproducing information from the optical information recording medium 1 is described as follows.

As shown in FIG. 2, the optical information recording medium 1 causes a laser light source such as a semiconductor laser 121 shown in FIG. 11 and an optical system such as a light collecting lens 31 corresponding to the objective lens 125 shown in FIG. 11 to transmit the reproduction beam 30 from the side of the transparent resin layer 11 to the internal surface (surface having at least either the pit or the groove) of the substrate 12, and causes an optical head (not shown) to detect light reflected by the internal surface, thereby reproducing the recorded information.

At this time, the reproduction beam 30 is irradiated to the optical information recording medium 1 so that a high temperature portion and a low temperature portion occur in the light beam spot of the temperature responsive layer 21.

For example, the reproduction beam 30 is transmitted from the side of the transparent resin layer 11 so as to be incident on the playback-only optical information recording medium 1, and the surface of the optical information recording medium 1 is scanned with the light beam 30 in a predetermined direction. Then, in a reproduction beam spot 33 on the surface of the temperature responsive layer 21, a temperature gradient occurs in a moving direction of the reproduction beam spot 33 as shown in FIG. 3(a) and FIG. 3(b). Thus, in the reproduction beam spot 33 on the surface of the temperature responsive layer 21, a high temperature portion 33a (second portion) occurs in the rear side with respect to the moving direction of the reproduction beam spot 33 and a low temperature portion 33b (first portion) occurs in the front side with respect to the moving direction of the reproduction beam spot 33. As to temperatures thereof, for example, the temperature of the high temperature portion 33a is 60° C. or higher and less than 180° C., and the temperature of the low temperature portion 33b is 20° C. or higher and less than 60° C.

In the high temperature portion 33a whose temperature has risen due to irradiation of the reproduction beam 30, the transmissivity of the temperature responsive layer 21 in the wavelength of the reproduction beam 30 drops (low transmissivity condition), a large quantity of incident light is shielded by the temperature responsive layer 21. Thus, a quantity of light passing through the temperature responsive layer 21 decreases, and also a quantity of light which is incident on the reflection layer 22 positioned in the side of a rear surface of the temperature responsive layer 21 (rear side with respect to the surface receiving the light beam) decreases. Thus, a quantity of light reflected by the reflection layer 22 is suppressed, so that the temperature responsive reflection layer 13 is entirely in a low reflectance state.

While, in the low temperature portion 33b whose temperature becomes lower than the temperature of the high temperature portion 33a, the transmissivity of the temperature responsive layer 21 in the wavelength of the reproduction beam 30 is kept in an initial state, and a quantity of light which is incident on the reflection layer 22 positioned in the side of the rear surface of the temperature responsive layer 21 becomes larger than a quantity of light which is incident on the high temperature portion 33a. Thus, also a quantity of light reflected by the reflection layer 22 increases, so that the whole temperature responsive reflection layer 13 becomes in a high reflectance state. Specifically, the temperature responsive reflection layer 13 can be in a low reflectance state, for example, when the temperature is 60° C. or higher and less than 180° C., and the temperature responsive reflection layer 13 can be in a high reflectance state, for example, when the temperature is 20° C. or higher and less than 60° C.

As a result, in the temperature responsive layer 21, the reproduction beam 30 hardly passes through a latter portion (high temperature portion 33a) of the reproduction beam spot 33. Thus, light is shielded at the high temperature portion 33a of the temperature responsive layer 21, and information is reproduced in accordance with light having passed through the low temperature portion 33b of the temperature responsive layer 21. That is, with the substrate 12 masked by the high temperature portion 33a, the optical head detects only reflected light having passed through the low temperature portion 33b whose temperature has not risen and positioned on the surface of the substrate 12, thereby reproducing information.

On this account, a size of the reproduction region in the surface (recording information surface) provided on the substrate 12 so as to have the pit and/or the groove can be made smaller than the reproduction beam spot 33 on the temperature responsive reflection layer 13. As a result, the size of the reproduction region can be made smaller, so that it is possible to improve the reproduction resolution. Thus, it is possible to surely reproduce information corresponding to a minute pit and/or a minute groove formed on the surface (recording information surface) of the substrate 12, particularly, information corresponding to a pit and/or a groove which is below the diffraction limit of the reproduction beam, with a higher reproduction signal intensity.

As described above, in the optical information recording medium of the present embodiment, the temperature responsive layer 21 is used, so that it is possible to reproduce a minute recording mark formed as a pit and/or a groove on the surface (recording information surface) of the substrate 12 and being below the diffraction limit of the reproduction beam.

Further, unlike Patent Document 1 in which the mask layer for raising the transmissivity of the high temperature portion is used to improve the reproduction resolution, the present embodiment is arranged so that the temperature responsive layer 21 for dropping the transmissivity of the high temperature portion 33a is used to improve the reproduction resolution.

As described above, the mask layer for raising the transmissivity of the high temperature portion is made of thermochromic material, a phase change material, or the like, which exhibits the mask effect by melting when the temperature rises to a certain level. Thus, when information repeatedly recorded and reproduced, the mask effect drops.

In contrast, the present embodiment uses the temperature responsive layer 21 which drops the transmissivity of the high temperature portion 33a. The temperature responsive layer 21 can be made of material such as metal oxide which does not melt due to the temperature rise at the time of recording or reproducing, so that the mask effect does not drop even when information is repeatedly recorded and reproduced. Thus, this arrangement results in such an advantage that the optical information recording medium 1 of the present embodiment is superior in the durability.

Further, in the optical information recording medium 1 of the present embodiment, the reflection layer 22 is provided on the temperature responsive layer 21 so as to be positioned in the rear surface with respect to the light receiving surface, and the temperature responsive layer 21 and the reflection layer 22 constitute the temperature responsive reflection layer 13 for dropping the reflectance of the light beam irradiated in response to the temperature rise caused by irradiation of the light beam. The arrangement adopts a reflective super-resolution reproduction mode whose principle is essentially different from that of the super-resolution mode (Patent Documents 1, 2, and the like) using the mask layer provided so as to change the transmissivity to the light receiving side.

Next, the optical absorption edge is described as follows. Generally, in case of an insulator or a semiconductor such as a transparent dielectric material, energy levels of conduction electrons are discontinuous, so that an energy band gap exists. In case of the insulator or the semiconductor, a Fermi level exists in the band gap, so that electric conduction is explained as transition from a valence band via the band gap to a conduction electron band in terms of energy.

In light having energy exceeding the band gap, it is possible to cause electrons to optically transit from the valence band to the conduction electron band as light absorption, so that light having high energy exceeding the band gap is absorbed, and light having lower energy is not absorbed and passes through. The lower limit of the absorbed photon energy is referred to as an optical absorption edge or an optical band gap. Further, a wavelength corresponding to the photon energy of the optical absorption edge is referred to as an optical absorption edge wavelength.

The thin layer or the like is not in an ideal crystal state but in an unfavorable state such as distortion, defection, deficit, an amorphous state, and the like. Thus, actually, light whose energy is slightly lower than that of the optical absorption edge comes to be partially absorbed, and light of the optical absorption edge is absorbed.

Figure 4:
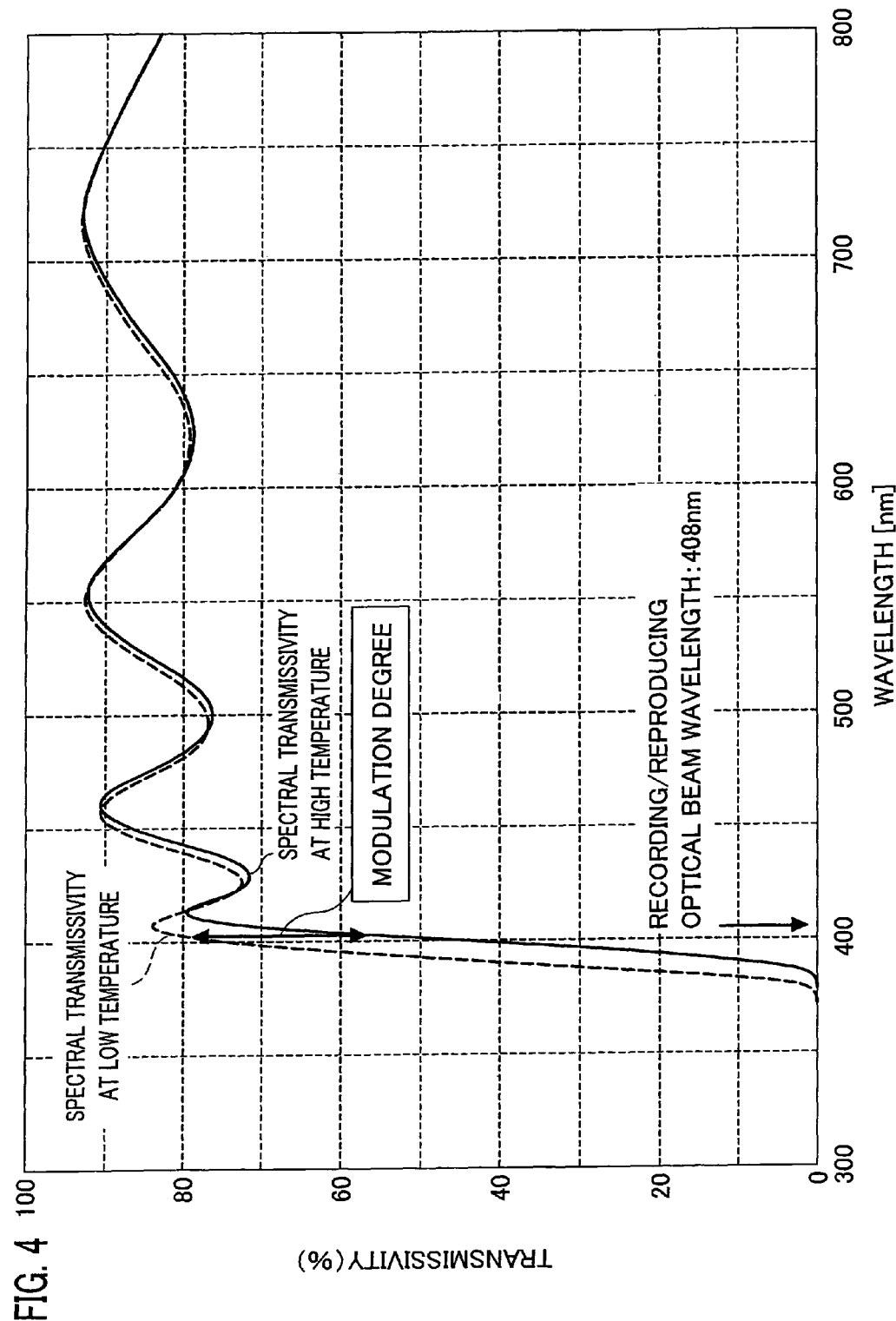
FIG. 4 is a graph showing an example of a temperature change in a spectral transmissivity property of a temperature responsive layer.

FIG. 4 shows a spectral transmissivity property (optical property) in the vicinity of the optical absorption edge of the temperature responsive layer 21 constituted of a ZnO layer having a thickness of 400 nm in case of a low temperature (30° C.) and in case of a high temperature (200° C.). An example of a condition under which transmissivity of ZnO has wavelength dependency is described as follows (although optical interference exists, this is not essential in this explanation, so that the optical interference is ignored here): light (around 400 nm) whose energy is lower than that of the optical absorption edge (375 nm), that is, light having a large wavelength comes to be partially absorbed, and the light is more extensively absorbed as the optical absorption edge having high energy, that is, the optical absorption edge on the side of a smaller wavelength comes closer, and the light is completely absorbed in the optical absorption edge (375 nm). Note that, a band gap of ZnO is said to be approximately 3.3 eV (375 nm in terms of a wavelength), and this exactly corresponds to the experiment result.

Next, the optical absorption edge and the temperature change are described as follows. In case of the semiconductor or the insulator, it is general that the band gap decreases with the temperature rise. As described above, the band gap and the optical absorption edge are essentially the same, so that also the optical absorption edge shifts to the lower energy side, i.e., the larger wavelength side. A wavelength dependency graphs shape (hereinafter, referred to as a transmissivity spectrum) indicative of the transmissivity of the temperature responsive layer 21 shifts to the large wavelength side, particularly in a range from the vicinity of the optical absorption edge to the reproduction beam wavelength.

According; to FIG. 4, a range from (i) a vicinity of 410 nm deviating from a recording/reproducing wavelength of 408 nm to the large wavelength side to (ii) a vicinity of the optical absorption edge wavelength deviating to the smaller wavelength side with the recording/reproducing wavelength of 408 nm therebetween shifts to the large wavelength side due to the temperature rise. At this time, the transmissivity in the large wavelength side is high in the range from the optical absorption edge to the reproduction beam wavelength. Thus, the transmissivity spectrum shifts to the large wavelength side, so that the spectral transmissivity in the wavelength of the reproduction beam drops. Thus, the temperature rise causes the spectral transmissivity in the wavelength of the reproduction beam to drop.

Thus, in the temperature responsive layer 21, as shown in FIG. 4, it is possible to increase the modulation degree of the transmissivity as the optical absorption edge wavelength and the reproduction beam wavelength come closer to each other in normal temperature, so that it is preferable to arrange the temperature responsive layer 21 in this manner. Note that, the modulation degree is represented by a difference between a spectral transmissivity at a low temperature and a spectral transmissivity at a high temperature.

In the result, it is preferable to arrange the temperature responsive layer 21 so that: the optical absorption edge wavelength (lower end of an absorption band existing in an ultraviolet/visible region) in the small wavelength side in normal temperature is smaller than the wavelength of the reproduction beam 30, and the optical absorption edge wavelength in the small wavelength side shifts to the large wavelength side in response to the temperature rise, and the spectral transmissivity in the wavelength of the reproduction beam 30 drops. For example, in case where the wavelength of the reproduction beam 30 is within a range from 380 nm to 415 nm (for example, 405 nm, 408 nm), it is preferable that the temperature responsive layer 21 is a ZnO layer whose optical absorption edge wavelength in the small wavelength side in normal temperature is around 375 nm.

The spectral transmissivity property of the ZnO layer is such that: as shown in FIG. 4, the optical absorption edge wavelength in the small wavelength side shifts to the large wavelength side due to the temperature rise. On this account, in the ZnO layer positioned at the high temperature portion 33a whose temperature has risen by receiving light, the spectral transmissivity in the wavelength of the reproduction beam 30 drops, so that the ZnO layer is in a low transmissivity state. Note that, in the ZnO layer positioned at the low temperature portion 33b whose temperature is relatively low, the light transmissivity is kept high. Further, after a temperature of a portion of the ZnO layer has risen, the temperature drops, so that the optical absorption edge wavelength in the small wavelength side of the spectral transmissivity property returns to the small wavelength side. This results in rise of the spectral transmissivity. On this account, the modulation degree (variation of the spectral transmissivity, in the wavelength of the reproduction beam 30, between the high temperature portion 33a and the low temperature portion 33b) can be made greater. Thus, the high temperature portion 33a can be masked without fail, so that it is possible to more surely obtain higher reproduction signal intensity.

Further, it is preferable to arrange the temperature responsive layer 21 so that: a condition under which the transmissivity property changes in response to a temperature is controlled in accordance with optical interference between reflected light on the one surface and reflected light on the other surface. In case of making the thickness of the temperature responsive layer 21 larger such as 100 nm or more, optical interference occurs between reflected light on the one surface and reflected light on the other surface, so that it is possible to design the spectral transmissivity property of the temperature responsive reflection layer 13. That is, the reflectance can be more greatly tilted in the vicinity of the optical absorption edge. As a result, the modulation degree (variation of the spectral transmissivity, in the wavelength of the reproduction beam 30, between the high temperature portion 33a and the low temperature portion 33b) can be made greater. Thus, the high temperature portion 33a can be masked without fail, so that it is possible to more surely obtain higher reproduction signal intensity. While, when the thickness of the temperature responsive layer 21 is less than 300 nm, the deposited layer surface corresponds to the bumpy shape of the substrate, and this is advantageous in terms of a process and cost.

The foregoing description explained the transmissivity property and a function of the temperature responsive layer 21 solely, but it is necessary to design an actual arrangement including all the layers as an actual optical information recording medium 1. Specifically, in the present embodiment, it is necessary to consider not only the optical interference of the temperature responsive layer 21 but also optical multiple interference which occurs between an interface with respect to the reflection layer 22 and an interface with respect to the transparent resin layer 11.

Figure 5:
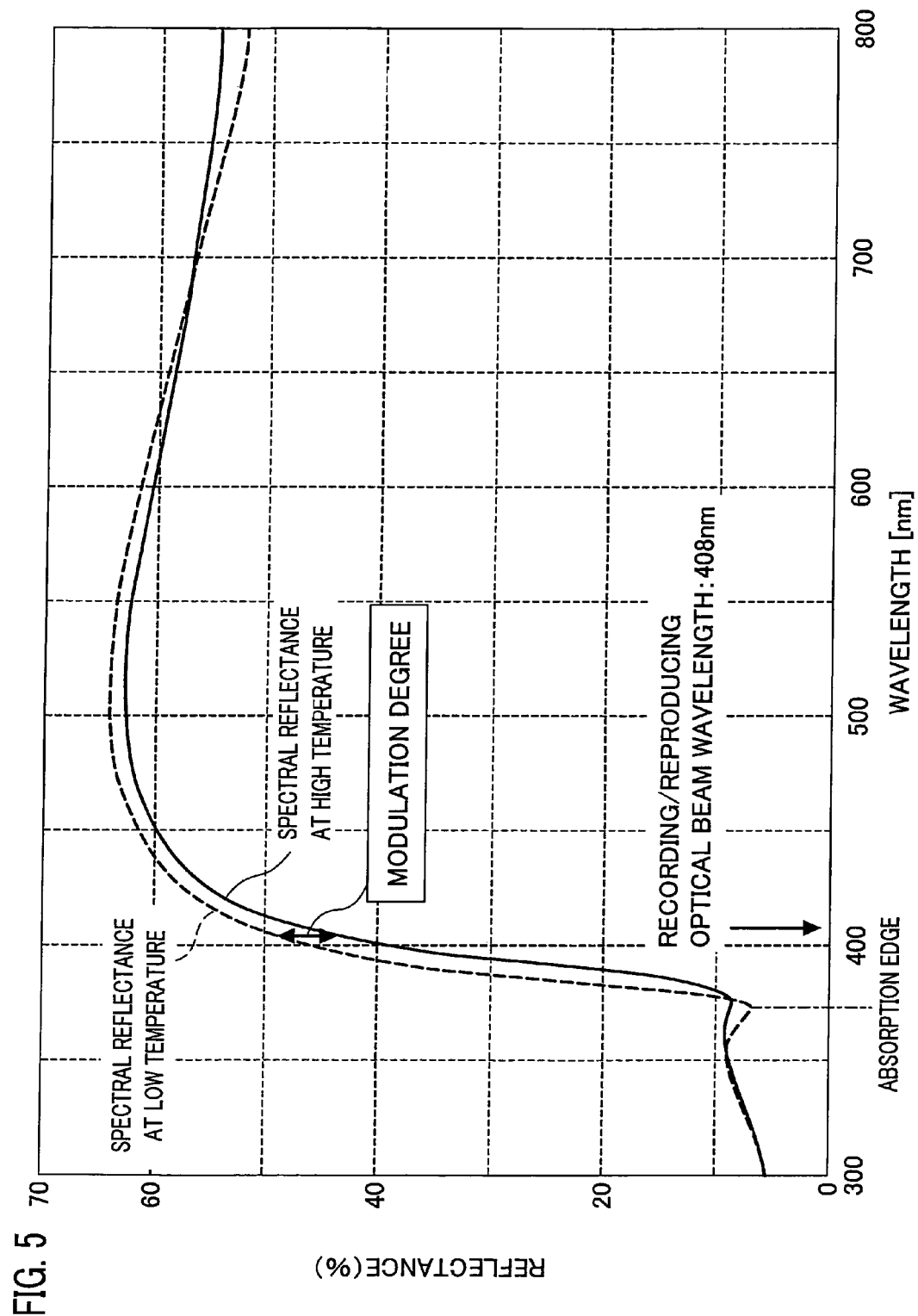
FIG. 5 is a graph showing an example of a temperature change in a spectral reflection property of the temperature responsive reflection layer, and illustrates a case where the temperature responsive layer is thin and there is no minimum value caused by an optical interference effect.
Figure 6:
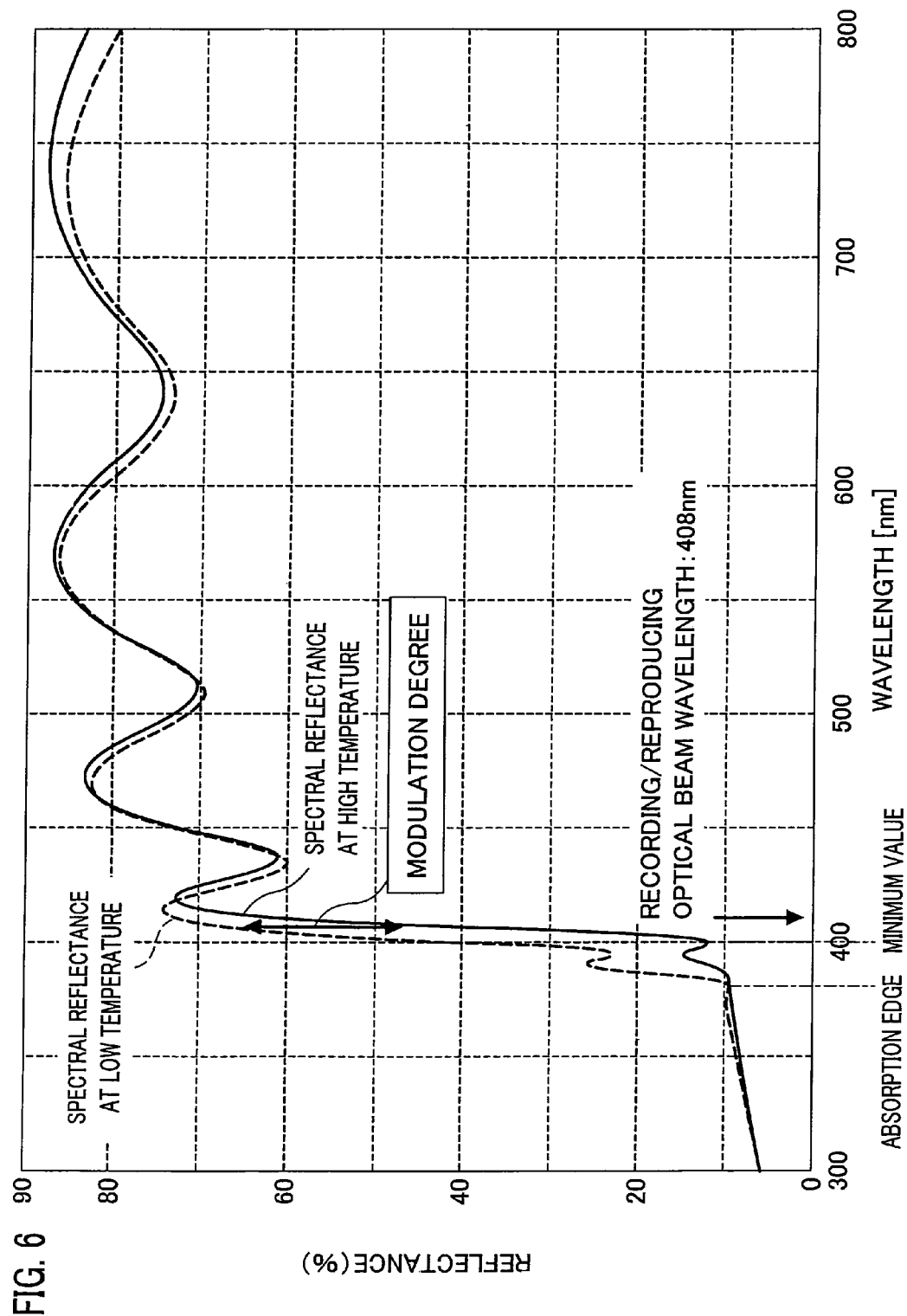
FIG. 6 is a graph showing another example of the temperature change in the spectral reflection property of the temperature responsive reflection layer, and illustrates a case where the temperature responsive layer is thick and there is the minimum value caused by the optical interference effect.

FIG. 5 shows the spectral reflectance property in the vicinity of the optical absorption edge of the temperature responsive reflection layer 13 constituted of a ZnO layer having a thickness of 100 nm and an Al layer having a thickness of 30 nm in case of a low temperature (30° C.) and in case of a high temperature (200° C.). Further, FIG. 6 shows the spectral reflectance property in the vicinity of the optical absorption edge of the temperature responsive layer 13 constituted of a ZnO layer having a thickness of 100 nm and an Al layer having a thickness of 30 nm in case of a low temperature (30° C.) and in case of a high temperature (200° C.). A reflectance in the same arrangement as in the optical information recording medium 1 is described as follows.

In case of the ZnO layer of 100 nm thickness shown in FIG. 5, in the recording/reproducing wavelength of 408 nm, the reflectance changes in response to the temperature change. In case of the ZnO layer of 400 nm thickness shown in FIG. 6, even when the reflectance changes due to the same temperature change in the same manner as in the thickness of 100 nm, a light path length greatly changes corresponding to the larger thickness, so that also the reflectance greatly changes. Furthermore, the optical multiple interference is greater since the thickness is larger, so that it is possible to more greatly change the reflectance by favorably designing the layer and using the arrangement. That is, it is preferable that the thickness of the ZnO layer is larger in terms of greater change of the reflectance.

As in the case where the temperature responsive layer 21 is solely described, even in case of the actual optical information recording medium 1 like the present embodiment, it is possible to change only a part of the reflectance by using temperature distribution in the beam spot. In case of FIG. 6 for example, the reflectance at the high temperature portion drops in the vicinity of the wavelength of the reproduction beam, so that the high temperature portion 33a can be masked without fail, so that it is possible to more surely obtain high signal intensity.

The optical absorption edge wavelength of the temperature responsive layer 21 changes due to the temperature change of the band gap of the metal oxide semiconductor. An effect can be obtained by using not only ZnO but also metal oxide compounds such as $SnO_2$, $CeO_2$, $NiO_2$, $In_2O_3$, $TiO_2$, $Ta_2O_5$, $VO_2$, $SrTiO_3$, and a mixture or a solid solution obtained by mixing the foregoing metal oxide compounds. Further, the foregoing components are described as compounds for convenience in description, but the thin layer is not necessarily limited to any stoicheiometric composition. As long as it is possible to realize the technical idea of the present invention and it is possible to obtain an effect of the present invention, a substance or a composition deviating from a stoicheiometric ratio may be used, or elements may be doped or may be displaced.

In case of ZnO for example, when a ratio of O is more than 1:1, an absorption edge wavelength $\lambda a$ is small, and when a ratio of Zn is adversely higher, the absorption edge wavelength $\lambda a$ is likely to be larger. Further, as to the layer thickness, a value of the absorption edge itself is a property value, so that the absorption edge does not change. However, as the layer thickness is larger, a quantity of absorbed light is larger, so that the transmissivity spectrum seems to shift to the large wavelength side. Thus, as to ZnO, it is possible to obtain a more favorable super-resolution property when the layer thickness is larger.

The optical information recording medium of the present embodiment can be manufactured, for example, by the following method.

First, on the substrate 12 having a surface (recording information surface) provided with the pit and/or the groove corresponding to the recording information, a metal layer serving as the reflection layer 22 and the temperature responsive layer 21 are sequentially formed in accordance with a magnetron sputtering process. Lastly, the temperature responsive reflection layer 13 is spin-coated with an ultraviolet curing acrylate resin or the like for protecting the information recording surface and the temperature responsive reflection layer 13 from an external environment, and the ultraviolet curing acrylate resin or the like is cured by irradiation of an ultraviolet ray, thereby forming the transparent resin layer 11.

Note that, the foregoing description explained the case where the recording/reproducing beam enters from the side of the transparent resin layer 11 into the optical information recording medium 1. However, the optical information recording medium of the present invention may be arranged so as to have a layer structure similar to that of the optical information recording medium 1 (note that, the temperature responsive layer 21 and the reflection layer 22 are adversely positioned in the temperature responsive reflection layer 13), and the reproduction beam enters from the side of the substrate 12. In this arrangement, it is preferable to form a protective layer on the temperature responsive reflection layer 13 so as to be positioned in the side opposite to the substrate 12.

According to the arrangement, as the substrate 12, it is preferable to use a material which does not prevent the entrance of the reproduction beam and gives the optical information recording medium an appropriate strength. Examples of the material include: glass; thermoplastic transparent resin such as polycarbonate, amorphous polyolefin, thermoplastic polyimide, PEN, and PES; thermosetting transparent resin such as thermosetting polyimide and ultraviolet curing acrylate resin; and a combination thereof. Generally, it is appropriate that the substrate 12 has a thickness ranging from 0.3 mm to 1.2 mm.

In this arrangement, the protective layer may be made of any material as long as the material can protect the temperature responsive reflection layer 13. Specifically, examples of the material are the same as in the substrate 12. Note that, the protective layer may be transparent or may be oblique. Generally, it is appropriate that the protective layer has a thickness ranging from 1 μm to 100 μm.

Further, in the optical information recording medium of the present invention, it is preferable to form both of or one of the pit and the groove on a single side of the substrate 12 as in the optical information recording medium 1. However, it is possible to form both of or one of the pit and the groove on each of both sides of the substrate 12.

Incidentally, as explained in the foregoing description, the optical absorption edge has a wavelength change, but the optical absorption edge or the shift amount changes depending on a kind of the material, so that the quantity of the transmissivity variation naturally changes depending on a magnitude relation and a positional relation between the optical absorption edge and the reproduction beam. Thus, the following test was performed by using specific optical information recording mediums so as to find favorable ranges of the foregoing values.

In the test, four types of optical information recording mediums of Example 1, Example 2, Comparative Example 1, and Comparative Example 2 were used.

Example 1

An optical information recording medium includes: a transparent resin layer 11 having a thickness of about 0.1 mm; a temperature responsive layer 21 constituted of a ZnO layer having a thickness of about 200 nm; a reflection layer 22 constituted of an Al layer having a thickness of about 30 nm; and a substrate 12, these members being formed in this order from a light beam receiving side, wherein a bumpy-patterned pit corresponding to information is formed on the substrate 12 so as to be positioned in an internal surface (surface on the side of the temperature responsive reflection layer 13) of the substrate 12.

Example 2

An optical information recording medium is arranged in the same manner as in the optical information recording medium of Example 1 except that not ZnO but $SnO_2$ is used as the temperature responsive layer 21.

Comparative Example 1

An optical information recording medium is arranged in the same manner as in the optical information recording medium of Example 1 except that not ZnO but $Si_3N_4$ is used as the temperature responsive layer 21.

Comparative Example 2

An optical information recording medium is arranged in the same manner as in the optical information recording medium of Example 1 except that the temperature responsive layer 21 is not provided. That is, the optical information recording medium includes: the transparent resin layer 11 having a thickness of about 0.1 mm; the reflection layer 22 constituted of an Al layer having a thickness of about 30 nm; and the substrate 12, these members being formed in this order from a light beam receiving side.

Of the four types of optical information recording mediums, three type excluding Comparative Example 2 are illustrated in Table 1 in terms of (i) a property value of a material for the temperature responsive layer and (ii) an actually measured optical absorption edge.

Each of ZnO used in Example 1 as the temperature responsive layer 21, $SnO_2$ used in Example 2 as the temperature responsive layer 21, and $Si_3N_4$ used in Comparative Example 1 as the temperature responsive layer 21 is a semiconductor or an insulator in which: the refraction is approximately n=2.0 in the vicinity of a wavelength of 400 nm to 800 nm and the transmissivity is 80% or more so that the semiconductor or the insulator is substantially transparent, and the band gap is 3 eV or more.

In other words, from an optic view point, they are identical with each other in terms of a transparent layer whose refraction is n=2.0, but they are different from each other in terms of the optical absorption edge wavelength, so that it is possible to compare them in terms of the optical absorption edge.

Further, these optical information recording mediums are substantially identical with each other in terms of the refraction, so that it is possible to design optical interference conditions, identical with each other, by adjusting a thickness of each temperature responsive layer 21.

TABLE 1

| | Material for temperature responsive layer | Band gap documentary value (eV) | Converted optical absorption edge (nm) | Actually measured optical absorption edge (nm) |
|---|---|---|---|---|
| Example 1 | ZnO | 3.3 | 376 | 375 |
| Example 2 | $SnO_2$ | 3.6 | 344 | 311 |
| Comparative Example 1 | $Si_3N_4$ | 5.3 | 234 | <300 |
| Comparative Example 2 | Not added | — | — | — |

The band gap documentary value shown in Table 1 is indicative of a value in a bulk of a material for each temperature responsive layer 21. Further, the converted optical absorption edge is an optical absorption edge in case where the band gap documentary value is converted into light.

The actually measured optical absorption edge was calculated as follows. That is, each temperature responsive layer 21 was solely formed on a substrate (7059 glass: product of Corning) so as to have a thickness shown in each of Examples and Comparative Examples, and the wavelength dependency of the transmissivity was measured via the substrate. Thereafter, thus measured value was corrected in consideration for the transmissivity of the substrate so as to give transmissivity evaluation. Then, the temperature responsive layer 21 wavelength dependency in the optical absorption rate was solely calculated by performing similar spectral measurement, thereby obtaining wavelength distribution of an absorption factor α in accordance with the layer thickness. As well known, in the optical absorption of the semiconductor, the following proportionality holds.

$(h\nu\alpha)^2 \propto (h\nu - E_g)$ Direct transition type $(h\nu\alpha)^{1/2} \propto (h\nu - E_g \pm h\nu_{ph})$ Indirect transition type Here, h represents a Planck constant, ν represents an optical frequency, a represents an absorption factor, $E_g$ represents an energy band gap (optical absorption edge), $\nu_{ph}$ represents a phonon frequency, hν represents optical energy, $\pm h\nu_{ph}$ represents energy of phonon absorption/release. In case of the indirect transition type, phonon excitation occurs with electron excitation due to the optical absorption, so that an energy term is included.

In accordance with these relational expression and absorption factor wavelength distribution (i.e., energy distribution), the optical absorption edges of Examples and Comparative Examples were calculated. A value of each ZnO having a transmissivity spectrum shown in FIG. 4 is substantially 375 nm, so that the documentary value and the optical absorption edge favorably correspond to each other. In case of $SnO_2$ of Example 2, the values deviate from each other by about 30 nm. This may be based on strictly different causes such as: a difference between the bulk and the thin layer; the aforementioned deviation of Sn and O from the stoicheiometric ratio; a difference in terms of a crystalline characteristic; and the like. Further, in the evaluation given to the $SnO_2$ sole layer, not only the temperature change in the vicinity of the optical absorption edge but also the same temperature change in the transmissivity spectrum as in ZnO of FIG. 4 was confirmed.

As to $Si_3N_4$ of Comparative Example 1, the optical absorption edge wavelength conversion value was 234 nm, but the optical absorption in a spectrum shape was not confirmed since the value was out of a measurable wavelength range of the spectrophotometer. Thus, the optical absorption edge was estimated as being at least 300 nm or less. Further, in the foregoing range, any temperature change in the transmissivity spectrum was not confirmed.

Figure 7:
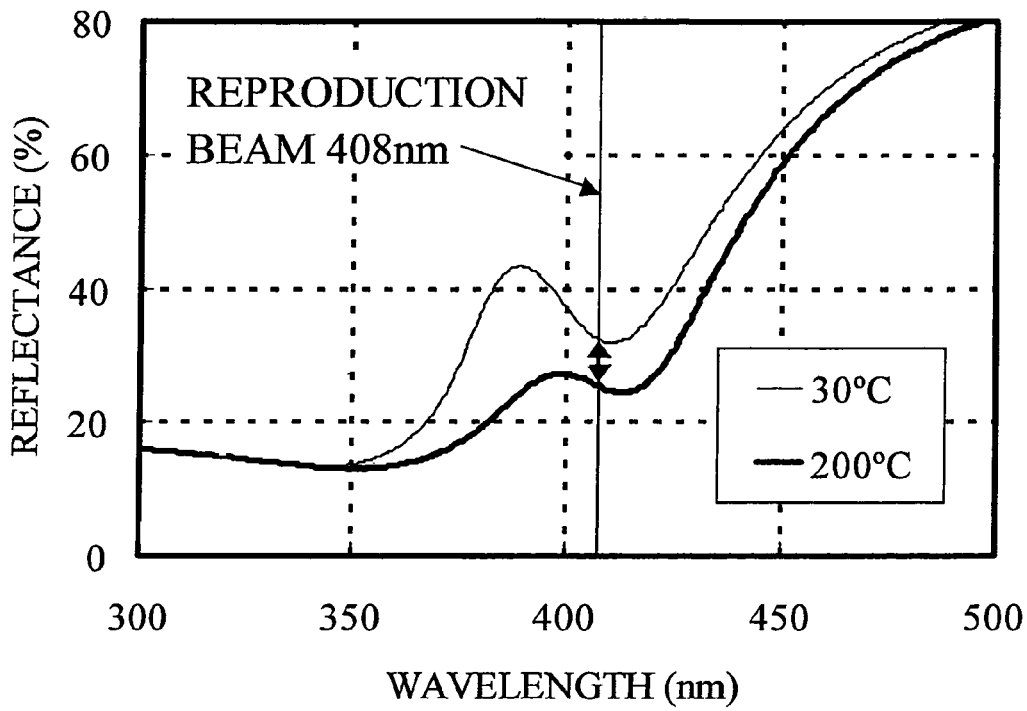
FIG. 7 is a graph showing a temperature change in a spectral reflection property in an optical information recording medium (Example 1) according to one embodiment of the present invention.

In each of Example 1, Example 2, and Comparative Example 1, optical interference corresponding to the refraction and the layer thickness of the temperature responsive layer 21 occurs. In the present embodiment, it was required to utilize a condition under which the transmissivity spectrum in the vicinity of the optical absorption edge of the temperature responsive layer 21 changes in response to a temperature, so that the thickness of the temperature responsive layer 21 was adjusted. FIG. 7 shows the reflectance of the optical information recording medium of Example 1 which had been adjusted for a blue evaluation device. Specifically, the whole optical information recording medium of Example 1 was arranged so as to have a reflection preventing structure in which reflection is prevented when the reproduction beam wavelength was 408 nm, that is, the whole optical information recording medium was arranged so as to have a structure in which the reflectance was minimum in the vicinity of the reproduction beam wavelength. On this account, the optical information recording medium was made to effectively utilize such a property that: a repetitive multiple reflection effect in the temperature responsive layer 21 is increased so as to decrease the transmissivity of the temperature responsive layer 21 (ZnO) due to the temperature rise caused by irradiation of the beam. As a result, the reflectance of the whole optical information recording medium of Example 1 was adjusted so as to be lowest as a ratio dropping from an initial state in which the reproduction beam had not been irradiated.

The optical information recording medium of Example 2 was arranged in the same manner as in the optical information recording medium of Example 1. In Comparative Example 1, the transmissivity of $Si_3N_4$ corresponding to the temperature responsive layer 21 did not actually change in response to the temperature, so that the optical information recording medium of Comparative Example 1 was set so as to be in the same optical interference state as in Examples 1 and 2. The foregoing three materials (ZnO, $SnO_2$, $Si_3N_4$) were substantially identical with each other in terms of the reflectance, so that the optical interference states were designed so as to be identical with each other by adjusting the layer thickness of each temperature responsive layer 21, thereby performing comparison.

Further, as in the blue evaluation device, a red evaluation device (wavelength was 656 nm) was adjusted so that the reflectance most significantly dropped due to the temperature rise in the reproduction beam wavelength of 656 nm. Thus, although ZnO was used in Example 1, two optical information recording mediums of Example 1 were prepared by optimizing a thickness of a temperature responsive layers 21 (ZnO) for blue evaluation and by optimizing a thickness of a temperature responsive layers 21 (ZnO) for red evaluation, thereby performing evaluation with the respective evaluation devices. Also in Example 2 and Comparative Example 2, the same samples were prepared, thereby performing evaluation. The reason for which the optical information recording mediums were respectively optimized in terms of a thickness for each evaluation device in the same Examples and Comparative Examples was such that: the object of the present embodiment was to clarify a relation between the optical absorption edge wavelength and the wavelength of the reproduction beam and to determine a potential of an optical information recording medium optimized under each reproduction beam condition.

Next, signal evaluation is described as follows. Two types of evaluation devices were used to perform the signal evaluation. Specifically, (i) a blue evaluation device having a blue laser whose wavelength was 408 nm and an optical system of an objective lens whose N.A was 0.65 and (ii) a red evaluation device having a red laser whose wavelength was 656 nm and an optical system of an objective lens whose N.A. was 0.65 were used. In each of them, maximum reproduction power was 4.5 mW, and the evaluation was performed at a linear velocity of 3 m/s.

The evaluation was performed by evaluating a carrier wave noise ratio C/N of a sequential pit column in which pits and spaces were alternately disposed (for example, when the pit length was 0.14 μm, pits were sequentially disposed at a cycle of 0.28 μm). A cutoff frequency in the optical system is represented by λ/2N.A. Thus, when the cutoff frequency is represented in terms of the pit length of the sequential pit, the resolution limit is reduced by half as λ/4N.A. Thus, the resolution limits of the optical systems were respectively the pit length of 0.16 μm and the pit length of 0.25 μm. When a pit smaller than the resolution limit is obtained for each evaluation device, that is, when a C/N of a sequential pit smaller than the foregoing value is obtained, this means that the super-resolution reproduction is realized.

Figure 8:
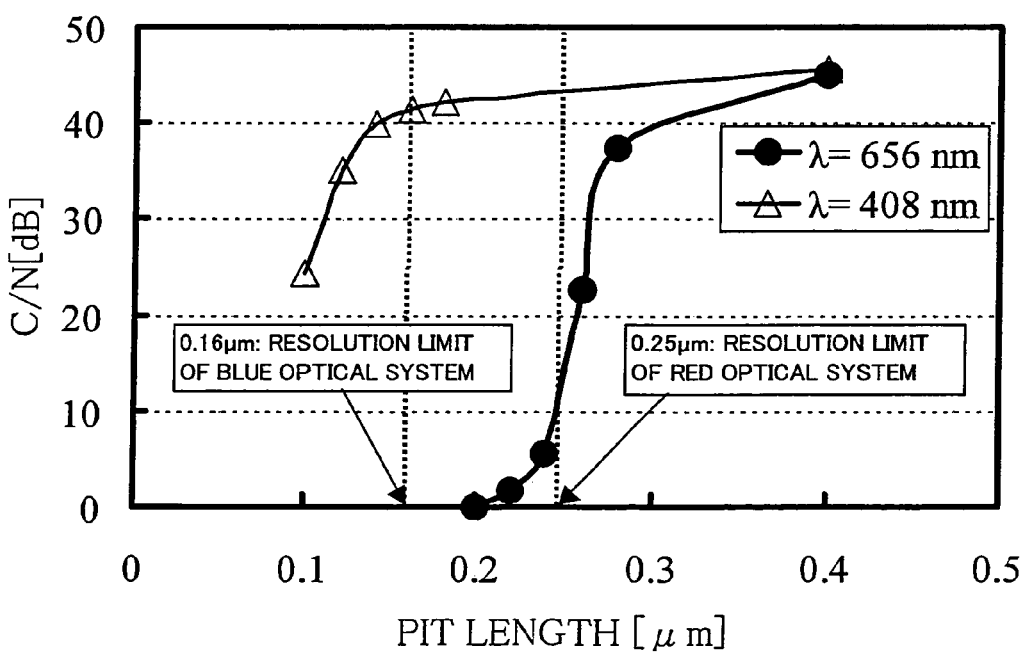
FIG. 8 is a graph showing CNR pit length dependencies obtained as results of signal evaluations performed with respect to a blue optical system and a red optical system in the optical information recording medium (Example 1) according to one embodiment of the present invention.

FIG. 8 shows an evaluation result of the carrier wave noise ratio C/N in each of the blue and red optical systems of Example 1. Note that, the reproduction beam power in the blue optical system and the reproduction beam power in the red optical system were 4.5 mW. As described above, the thickness of the temperature responsive layer 21 (ZnO) optimized for each of blue and red was optimized, so that the optical information recording mediums evaluated by both the optical systems were different from each other. Further, in each evaluation device, the C/N was maximum when the reproduction beam power was maximum as 4.5 mW. This may be based on the following reason: when the temperature rise caused by irradiation of the reproduction beam was maximum in the evaluation device, the transmissivity of the temperature responsive layer 21 (ZnO) most greatly changed in response to the temperature, so that the modulation degree of the reflectance of the optical information recording medium was maximum.

As apparent from the graph, in the evaluation performed with the red optical system of Example 1, as to the sequential pit having a pit length of 0.24 μm which was a vicinity of the resolution limit of the optical system, the C/N was equal to or smaller than 6 dB, and the C/N was substantially 0 in a pit smaller than the sequential pit (0.24 μm), so that it was impossible to read the pit smaller than the limit of the optical system, which resulted no super-resolution reproduction effect. In contrast, in the evaluation performed with the blue optical system of Example 1, as to the sequential (repetitive) pit having a pit length of 0.16 μm which was a resolution pit of the optical system, the C/N of 40 dB or more was obtained, and the C/N of 300 dB or more was obtained also as to the sequential pit having a shorter pit length of 0.14 μm and the sequential pit having a shorter pit length of 0.12 μm. That is, the super-resolution effect exceeding the resolution limit of the optical system was obtained.

Also in Example 2, Comparative Example 1, and Comparative Example 2, the same evaluation was performed. Table 2 shows C/N evaluation results respectively obtained by performing evaluation with the blue and red evaluation devices. In any case, the optimum laser power in the blue optical system and the optimum laser power in the red optical system was 4.5 mW. The data shown in Table 2 indicates evaluation results obtained by performing evaluation with respect to a pit whose length was smaller than the resolution limit of each optical system, that is, a sequential pit whose length was 0.14 μm in the blue optical system and a sequential pit whose length was 0.24 μm in the red optical system.

TABLE 2

| | Material for temperature responsive layer | Actually measured optical absorption edge (nm) | C/N blue (dB) | C/N red (dB) |
| --- | --- | --- | --- | --- |
| Example 1 | ZnO | 375 | 39.9 | 5.6 |
| Example 2 | SnO$_2$ | 311 | 24.5 | 3.0 |
| Comparative Example 1 | Si$_2$N$_4$ | <300 | 2.5 | 1.3 |
| Comparative Example 2 | Not added | — | 1.2 | 1.0 |

The evaluation results of Table 2 show the following condition.

Comparative Example 2 shows that it is impossible to reproduce a pit sequence whose length is smaller than the resolution limit of each optical system merely with a general reflection layer Al (30 nm). That is, the resolution limit of the optical system can be proofed. In Comparative Example 1, the optical absorption edge is smaller than the wavelength of the blue reproduction beam by a range of 408 nm to 100 nm or more and is smaller than the wavelength of the red reproduction beam by 370 nm or more. Thus, it is impossible to obtain the super-resolution effect in case where the optical absorption edge is smaller than the reproduction beam wavelength by 100 nm or more.

In Example 2, the optical absorption edge is smaller than the blue wavelength by about 100 nm and is smaller than the red wavelength by about 350 nm. In Example 1, the optical absorption edge is smaller than the blue wavelength by 30 nm and is smaller than the red wavelength by 280 nm.

In Example 2, the C/N of 20 dB or more is obtained in the pit whose length is smaller than the resolution limit in the blue optical system, thereby obtaining the super-resolution effect. However, even when the optical absorption edge moves and the transmissivity changes due to the temperature rise in the same temperature responsive layer 21 (SnO$_2$), it is impossible to obtain the super-resolution effect in the red optical system in which the optical absorption edge deviates from the reproduction beam wavelength by 350 nm.

Likewise, Example 1 shows that: in a pit smaller than the resolution limit in the blue optical system, a C/N of about 40 dB practically usable at this pit size had been obtained, thereby obtaining the super-resolution effect. However, even when the optical absorption edge moves and the transmissivity changes due to the temperature rise in the same temperature responsive layer 21 (ZnO), it is impossible to obtain the red optical system in which the optical absorption edge deviates from the reproduction beam wavelength by 280 nm.

In short, comparison among Example 1, Example 2, Comparative Example 1 in terms of the blue optical system shows that: in the temperature responsive layer 21, when $\lambda r-100<\lambda a$ where the optical absorption edge wavelength at a normal temperature is $\lambda a$ (nm) and the wavelength of the reproduction beam is $\lambda r$, it is possible to obtain the super-resolution effect.

In the foregoing description, the movement of the optical absorption edge due to the temperature rise causes the transmissivity of the temperature responsive layer 21 to change and causes the reflectance of the optical information recording medium to change, thereby performing the super-resolution reproduction. Further, when the reproduction beam wavelength is in proximity to the optical absorption edge, the shift of the optical absorption edge increases the variation of the transmissivity of the temperature responsive layer 21, so that this arrangement is advantageous. However, when the reproduction beam has a wavelength smaller than the optical absorption edge wavelength of the temperature responsive layer 21, the temperature responsive layer 21 absorbs substantially all the reproduction beam, so that its effect is lost. Thus, it is necessary that $\lambda a<\lambda r$. That is, in the temperature responsive layer 21, it is necessary that $\lambda r-100<\lambda a<\lambda r$ where the optical absorption edge wavelength at a normal temperature is $\lambda a$ (nm) and the wavelength of the reproduction beam is $\lambda r$ (nm).

In both Example 1 and Example 2 in which the optical absorption edge moves due to the temperature rise, the super-resolution effect is not obtained in the red optical system. For example, in ZnO serving as the temperature responsive layer 21 of Example 1, when the reproduction beam wavelength of 656 nm of the red optical system is represented by $\lambda r$ and is compared with the optical absorption edge wavelength of 375 nm, there is a difference of 280 nm therebetween, so that these wavelengths greatly deviate from each other. The transmissivity spectrum of the temperature responsive layer 21 greatly shifts in the vicinity of the optical absorption edge, but the reproduction wavelength of the red optical system does not greatly change, so that it is impossible to obtain the super-resolution effect of the present invention. Further, at this time, $\lambda a<\lambda r-100$, so that the foregoing condition is not satisfied. That is, it is apparent that the super-resolution effect cannot be obtained in case where the foregoing condition is not satisfied. This is applicable to Example 2.

In short, in order to obtain the effect of the present invention, the temperature responsive layer 21 requires such condition that $\lambda r-100<\lambda a<\lambda r$ where the optical absorption edge wavelength at a normal temperature is $\lambda a$ (nm) and the wavelength of the reproduction beam is $\lambda r$ (nm).

Laser devices used in actual optical recoding, particularly, in general products are manufactured as mass production, so that wavelengths thereof are likely to have substantially a specific value, e.g., a value in the vicinity of 405 nm in case of blue-violet laser, or main values such as 635 nm, 650 nm, 780 nm, and the like. Under such condition, the temperature responsive layer 21 requires the foregoing limit equation to be satisfied, so that a material of the temperature responsive layer 21 whose optical absorption edge is in the foregoing range is limited. For example, not only ZnO of Example 1 and SnO$_2$ of Example 2 but also ZnS and GaN satisfy the foregoing limit equation. An improving method thereof is as follows.

For example, it is generally known that: in case of using the aforementioned ZnO as the temperature responsive layer 21, when not Zn but Cd is doped in ZnO, the optical absorption edge shifts to a low energy side, i.e., a large wavelength side while keeping the same crystal structure, or when Mg is doped, the optical absorption edge adversely shifts to a high energy side, i.e., a small wavelength side. In the field of laser development, It is general not only to use these materials but also to control the band width by doping or displacing elements with respect to a semiconductor.

Alternatively, it is known that a new level is prepared not only by doping metal elements but also by doping substances other than metal elements, e.g., by utilizing oxygen deficit or oxygen rich or by performing N-dope, so as to change the optical absorption property. When these phenomena are utilized, it is possible to control the optical absorption edge, so that a substantially desired mother material is selected so as to correspond to a specific wavelength used in laser, and element doping or displacement are performed so as to control the optical absorption edge to have a desired wavelength.

According to this method, it is possible to more freely select a material for the temperature responsive layer 21, and the manufacturing cost is reduced, so that this method is advantageous for practical use. Thus, a material for the temperature responsive layer 21 exemplified in Embodiment 1 is not limited to a single compound such as "ZnO", but it may be so arranged that the temperature responsive layer 21 is made of a mixture or a solid solution obtained by mixing the aforementioned materials with each other, or is made of a solid solution or a mixture realized by doping or displacing elements such as (Zn, Cd)O or (Zn, Mg)O, Zn(O, N), ZnO$_{1-x}$, Zn$_{1-x}$O.

Note that, as apparent from the results shown in Comparative Example 2, the conventional optical information recording medium having only the reflection layer and having no temperature responsive layer cannot obtain the super-resolution effect. Further, the temperature responsive layer is not provided, so that there is no optical absorption edge wavelength λa of the temperature responsive layer. Thus, it is impossible to realize such condition that λr−100<λa<λr.

The modulation degree is variation calculated in accordance with the reflectance at two temperatures, i.e., 30° C. and 200° C. in this case, and this is only an example. For example, when the vicinity of 450 nm of the spectrum shown in FIG. 6 is focused on, the modulation degree seems to be 0 at 30° C. and 200° C., but this is merely because both effects of the optical multiple interference and the spectrum shift cause the reflectance to have the same value. Thus, this does not mean that the reflectance does not essentially change in response to a temperature, but the reflectance has a modulation degree at other temperature.

Figure 12:
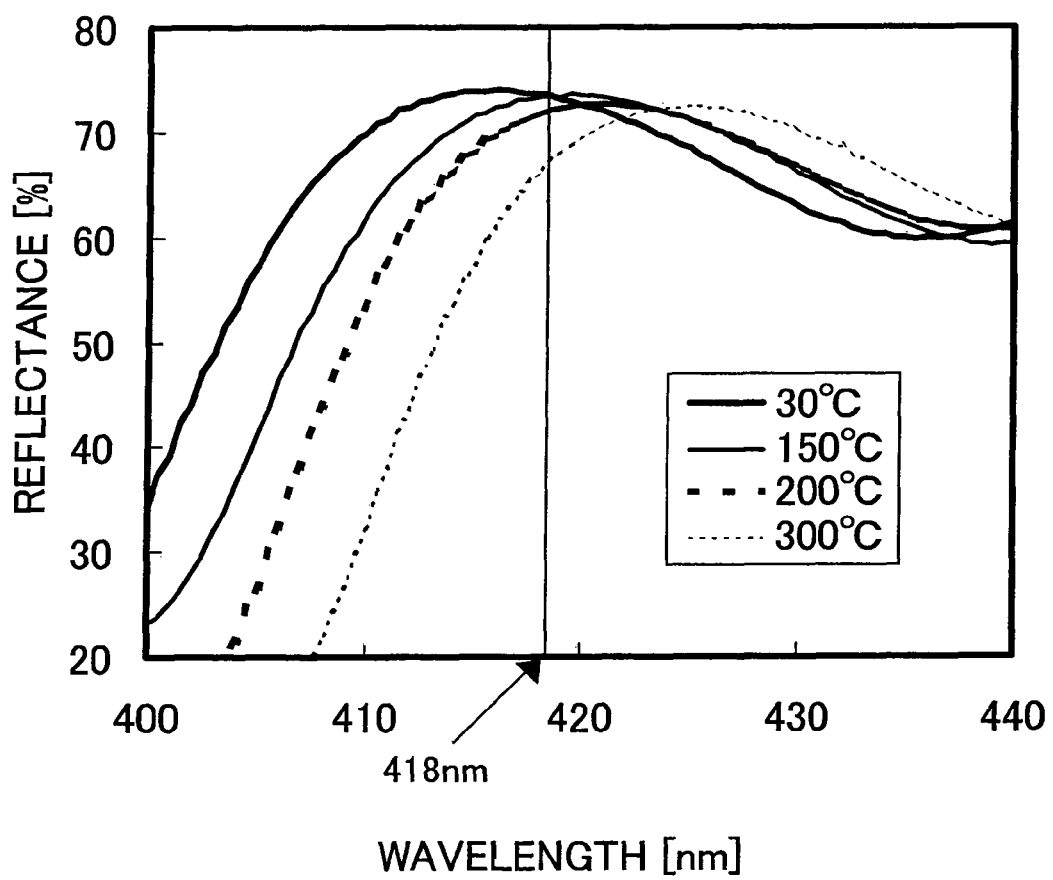
FIG. 12 is a graph showing another example of the temperature variation in the spectral reflection property of the temperature responsive reflection layer, and illustrates a case where the temperature responsive layer is thick and a modulation degree is based on the optical interference.

Here, the foregoing condition is specifically explained as follows with reference to Figures. FIG. 12 shows a spectral reflectance of the temperature responsive reflection layer which is shown in FIG. 6 so as to correspond to a wavelength. For convenience in the description, a range of the spectral reflectance is narrower than that of FIG. 6, and each measuring temperature is wider than that of FIG. 6.

FIG. 12 shows that: the thickness of the temperature responsive layer is large in this sample, so that the optical multiple interference causes the spectrum to have a mountain-valley shape. Further, as the temperature rises from 30° C. to 150° C., 200° C., and 300° C., the mountain-valley shape apparently shifts to the large wavelength side. This is caused by such condition that: a value indicative of the reflectance in each wavelength changes and the value shifts with respect to the wavelength. At this time, in case where a wavelength of 418 nm indicated by a vertical line is focused on, when the temperature rises from 30° C. to 150° C., the reflectance has a value in the vicinity of 73% at these temperatures, so that the reflectance seems not to change.

However, this phenomenon occurs merely because the reflectance happens to seem not to change due to both effects of the optical multiple interference and the spectrum shift, but the spectrum shift actually occurs. Further, when the temperature further rises to 200° C., 300° C., also the spectrum shifts. Also the reflectance at 418 nm apparently changes from the values at 30° C. and 150° C. (in this case, the reflectance drops).

That is, when the spectrum shift occurs, the reflectance essentially changes in response to a temperature. Thus, even when the modulation degree of the reflectance in transition from a room temperature to a certain temperature seems to be 0, the reflectance changes at other temperature.

Next, temperature distribution in the beam spot is described as follows. The foregoing description illustrated such condition that, in the beam spot, the temperature digitally switches at each region of FIG. 3(b). However, this illustration is merely schematic for convenience in the description. Actually, as shown in FIG. 3(a) for example, it is general that the temperature distribution sequentially extends from a room temperature point via a maximum temperature region to the outside of the spot. As generally known in the field of the optical recording, this is because the optical intensity on the beam spot indicates substantially Gaussian distribution. Generally, the optical intensity is highest at the center of the beam spot, but the highest temperature does not correspond to the center of the beam spot since the medium moves, so that the point of the highest temperature slightly deviates backward with respect to a moving direction of the beam spot. Thus, the temperature is not necessarily constant in the high temperature portion 33a, and the temperature distribution is as shown in FIG. 3(a). Likewise, the temperature is not necessarily constant in the low temperature portion 33b, and the temperature distribution occurs.

The foregoing condition is further described as follows. A spectrum in a high temperature state (for example, FIG. 6) is a spectrum at a certain high temperature, and is a partial spectrum in the beam spot, and does not correspond to a state of the whole shaded region. Thus, in case where the modulation degree of the reflectance in transition from a room temperature to a certain temperature seems to be 0, even when there is no modulation degree in the temperature region, a modulation degree exists in a region other than the temperature region. That is, in view of the whole beam spot, a part is masked, so that the resolution becomes high.

For confirmation, the measurement was actually performed with respect to the evaluation device having the wavelength of 408 nm. In the measurement, an optical information recording medium arranged in substantially the same manner as in Example 1 was used, and the layer thickness of ZnO was adjusted so that the reflectance had substantially the same value at 30° C. and 150° C. at the wavelength of 408 nm, thereby designing the optical interference state. As a result of the same C/N evaluation performed with respect to the optical information recording medium, it was confirmed that the optical information recording medium exhibited the super-resolution reproduction. That is, it was found that the optical information recording medium whose modulation degree was 0 in transition from a room temperature to a certain temperature exhibited the super-resolution reproduction.

As described above, there is no inconsistency between the condition under which the modulation degree in transition from a room temperature to a certain temperature is 0 and the explanation of the super-resolution effect brought about by the present invention.

Note that, the foregoing description explained the optical property as the transmissivity of the temperature responsive layer 21, but an index of the optical property is not limited to the transmissivity as long as the temperature change causes the optical property to change. The index of the change may be the reflectance of the optical information recording medium 1, or may be the transmissivity of the temperature responsive layer 21. Not only the reflectance and the transmissivity of the temperature responsive layer 21 but also a refraction index, a complex refractive index, or an extinction coefficient serving as an imaginary part thereof, an absorption coefficient, a dielectric constant, a complex dielectric constant, or a loss dielectric constant serving as an imaginary part thereof, or any other value may be used as the index. An object of the present invention is to provide the optical information recording medium 1, in which the optical property of the temperature responsive layer 21 changes due to the temperature change and the reflectance in the beam spot is partially changed so as to realize the super-resolution reproduction. As long as the object is achieved, any optical parameter (optical property) may be used as the index in confirming the change.

Further, Patent Document 4 mentions zinc oxide as an example of the material of the optical information recording medium for the super-resolution reproduction, and utilizes the band gap, and its object is to perform the super-resolution reproduction by using zinc oxide. From this view point, Patent Document 4 and the present invention are identical with each other.

However, this technique is to obtain the super-resolution effect by utilizing Stark effect (electron excitation and absorption/saturation) of a semiconductor, and Patent Document 4 discloses that it is most appropriate that a wavelength corresponding to the band gap is larger than the reproduction wavelength. That is, Patent Document 4 is different from the present invention, in which the shift of the band gap is utilized, in terms of principle. The property thereof is opposite to that of the present invention in which $\lambda a < \lambda r$. Further, the transmissivity rise in a photon mode is utilized, so that Patent Document 4 is different from the present invention in which the transmissivity change in a heat mode is utilized.

Embodiment 2

Another embodiment of the present invention is described as follows. Note that, for convenience in the description, the same reference numerals are given to members having the same functions as members described in Embodiment 1, and description thereof is omitted.

In Embodiment 1, the temperature responsive reflection layer 13 is divided into the temperature responsive layer 21 and the reflection layer 22, and the reflection layer 22 is made of Al whose thickness is about 30 nm. However, in Embodiment 2, $Si_3N_4$ (20 nm), Al (15 nm), and $Si_3N_4$ (40 nm) are sequentially formed from the light receiving side as the reflection layer 22. Both surfaces of the reflection layer thinner than that of Embodiment 1 are protected with a transparent inductive material $Si_3N_4$. This is made of plural layers, but three layers are collectively regarded as being the reflection layer 22.

There are two reasons for which the reflection layer 22 is arranged in the foregoing manner. The one of the reasons is as follows. In case where it is necessary to make the optical information recording medium voluminal (multi-layered), specifically, it is necessary to use the transmissivity of each recording layer, the transmissivity of the reflection layer used in Embodiment 1 is low, so that this is not appropriate. Thus, the layer thickness of Al is decreased to 15 nm so as to improve the transmissivity.

However, in case where Al becomes thinner to about 15 nm, when the temperature rises due to irradiation of the reproduction beam, heat damage or oxidization is likely to occur. Thus, in order to protect the Al layer, inorganic transparent layers of $Si_3N_4$ are provided on both sides of the Al layer. The inorganic transparent layer allows light to pass therethrough so as to efficiently utilize the light, and is expected to function as a protective layer which hardly degenerates, deteriorates, and oxidizes also at a high temperature. Actually, it was confirmed that: in the Al reflection layer protected with the inorganic transparent layer of $Si_3N_4$, the quality (reflectance or the like) of the reflection layer did not deteriorate even when the temperature rose, e.g., heat damage or oxidization did not occur.

Note that, in Embodiment 2, the protective layers are provided on both sides of the Al layer. However, even when the protective layer is provided on only one side of the Al layer, it is possible to obtain the protective effect with respect to the Al layer. However, when the protective layer is provided on only one side of the Al layer, it is preferable to provide the protective layer between the Al layer positioned in the outermost side of the thin layer portion and the substrate 12 so as to prevent oxidization.

The other one of the foregoing reasons is as follows. That is, as described in Embodiment 1, when the temperature of the temperature responsive layer 21 further rises, the transmissivity greatly changes. In Embodiment 1, high C/N is obtained with the maximum reproduction beam power. This shows that: when the temperature of the optical information recording medium, specifically, the temperature of the temperature responsive layer 21 more greatly rises, this is more advantageous.

However, in case where the reflection layer 22 has a layer thickness of a material such as Al, Ag, and Au, whose heat conductivity is relatively high, heat generated by irradiation of the beam is likely to conduct in the reflection layer 22 (Al in Embodiment 1) whose heat conductivity is high, and the heat hardly conducts or is hardly accumulated in the temperature responsive layer 21.

In order to efficiently conduct or accumulate the heat, generated by irradiation of the reproduction beam, into the temperature responsive layer 21 without releasing the heat, it is necessary to make Al, whose heat conductivity is relatively high, thinner. Further, the protective layers made of transparent inductive material $Si_3N_4$ are provided on both sides of the Al layer, so that it is possible to obtain not only such an effect that oxidization or heat damage can be avoided as described above but also such an effect that it is possible to prevent heat from conducting and being released from the temperature responsive layer 21 to the Al layer by preventing the Al layer from being directly in contact with the temperature responsive layer 21.

Note that, in case where the protective layer is provided on only one side, it is preferable to provide the protective layer between the Al layer and the temperature responsive layer 21 in order to obtain a heat insulation effect between the Al layer and the temperature responsive layer 21 as described above.

In this case, there is a possibility that the protective layer can shield a chemical reaction between the Al layer and the temperature responsive layer 21.

Here, as in Embodiment 1, comparison and study were performed by specifically using the optical information recording medium of Embodiment 2. Four types of optical information recording mediums were respectively used in Example 3, Example 4, Comparative Example 3, and Comparative Example 4.

Example 3

An optical information recording medium includes: a transparent resin layer 11 having a thickness of about 0.1 mm; a temperature responsive layer 21 constituted of a ZnO layer having a thickness of about 200 nm; a reflection layer 22 constituted of three layers as (i) $Si_3N_4$ (20 nm), (ii) Al (15 nm), and (iii) $Si_3N_4$ (40 nm); and a substrate 12, these members being formed in this order from a light beam receiving side, wherein a bumpy-patterned pit corresponding to information is formed on the substrate 12 so as to be positioned in an internal surface (surface on the side of the temperature responsive reflection layer 13) of the substrate 12.

Example 4

An optical information recording medium is arranged in the same manner as in the optical information recording medium of Example 3 except that not ZnO but $SnO_2$ is used as the temperature responsive layer 21.

Comparative Example 3

An optical information recording medium is arranged in the same manner as in the optical information recording medium of Example 1 except that not ZnO but $Si_3N_4$ is used as the temperature responsive layer 21.

Comparative Example 4

An optical information recording medium is arranged in the same manner as in the optical information recording medium of Example 1 except that the temperature responsive layer 21 is not provided. That is, the optical information recording medium includes: the transparent resin layer 11 having a thickness of about 0.1 mm; the reflection layer 22 constituted of three layers as (i) $Si_3N_4$ (20 nm), (ii) Al (15 nm), and (iii) $Si_3N_4$ (40 nm); and the substrate 12, these members being formed in this order from a light beam receiving side.

As described in Embodiment 1, the optical interference state was adjusted so that the transmissivity change of the temperature responsive layer 21 most directly corresponded to the reflectance change of the optical information recording medium. Results thereof are shown in Table 3. The optical absorption edge, the C/N blue, the C/N red are defined in the same manner as in Embodiment 1. Further, in any case, the optimum laser power in the blue optical system and the optimum laser power in the red optical system was respectively 4.5 mW as in Embodiment 1.

TABLE 3

| | Material for temperature responsive layer | Actually measured optical absorption edge (nm) | C/N blue (dB) | C/N red (dB) |
|---|---|---|---|---|
| Example 3 | ZnO | 375 | 37.8 | 4.5 |
| Example 4 | $SnO_2$ | 311 | 17.1 | 2.5 |
| Comparative Example 3 | $Si_3N_4$ | <300 | 2.8 | 1.2 |
| Comparative Example 4 | Not added | — | 3.4 | 1.1 |

The evaluation results of Table 3 show the following condition.

Each of the optical information recording mediums obtained substantially the same C/N as that of the corresponding optical information recording medium of Embodiment 1, i.e., the optical information recording medium having the temperature responsive layer made of the same material (Example 3 corresponds to Example 1, Example 4 corresponds to Example 2, Comparative Example 3 corresponds to Comparative Example 1, and Comparative Example 4 corresponds to Comparative Example 2). Further, the temperature responsive layer 21 is under such condition that $\lambda r-100<\lambda a<\lambda r$ where the optical absorption edge wavelength at a normal temperature was $\lambda a$ (nm) and the wavelength of the reproduction beam was $\lambda r$ (nm). Further, in the Examples and Comparative Examples, it was confirmed that a quantity of transmitted light was larger than that in Embodiment 1. This can result from the thinner Al layer of the reflection layer 22.

Further, the Al (15 nm) sole layer having no $Si_3N_4$ layers on both sides thereof was studied. As a result, heat damage and oxidization occurred, and the C/N deteriorated, but such deterioration of the C/N was not observed in Example 3, Example 4, Comparative Example 3, and Comparative Example 4. This can result from the $Si_3N_4$ layers provided on both the sides of the Al layer. Specifically, this can result from such condition that: $Si_3N_4$ is a compound which is made of inorganic substance and is not deteriorated by high temperature caused by irradiation of the reproduction beam and does not have any oxygen, so that oxidization of Al is prevented.

In obtaining the foregoing effect, $Si_3N_4$ is not particularly limited, but it is possible to use an inorganic transparent layer made of material such as nitride (AlN or the like) containing no oxygen, sulfide (ZnS or the like) or fluoride ($MgF_2$ or the like), or $SiO_2$ or $Ta_2O_5$ which is stable though this is oxide, or a mixture (ZnS—$SiO_2$) or a solid solution obtained by combining the foregoing materials.

The C/N property in Comparative Example 4 was the same as in Comparative Example 2 of Embodiment 1 (see Table 3). This result shows that: even when the reflection layer 22 is made of (i) $Si_3N_4$ (20 nm), (ii) Al (15 nm), and (iii) $Si_3N_4$ (40 nm), these materials can be regarded as being a single reflection layer 22. Further, also in Example 3, Example 4, and Comparative Example 3, the same signal property as in Example 1, Example 2, and Comparative Example 1 of Embodiment 1 was obtained by using the reflection layer 22 arranged in the foregoing manner, so that the foregoing materials can be regarded as being a single reflection layer 22 also in these Examples and Comparative Example.

According to the foregoing evaluation results, in addition to the effect obtained in Example 1, it is advantageous in making the medium multi-layered and voluminal to arrange the reflection layer 22 in the same manner as in Embodiment 2 since it is possible to utilize the transmitted light without greatly dropping the C/N.

Note that, Embodiment 2 described the optical information recording medium in which the protective layers were provided on both sides of the reflection layer, but the protective layer can prevent the reflection layer from deteriorating even when the protective layer is provided on only one side of the reflection layer. Further, in order to efficiently conduct or accumulate the heat, generated by irradiation of the reproduction beam, into the temperature responsive layer 21 without releasing the heat, it is preferable to provide the protective layer on the reflection layer so as to be positioned on the side of the temperature responsive layer.

Embodiment 3

Another embodiment of the present invention is described as follows with reference to FIG. 9 and FIG. 10. Note that, for convenience in the description, the same reference numerals are given to members having the same functions as members described in Embodiment 1, and description thereof is omitted.

Figure 9:
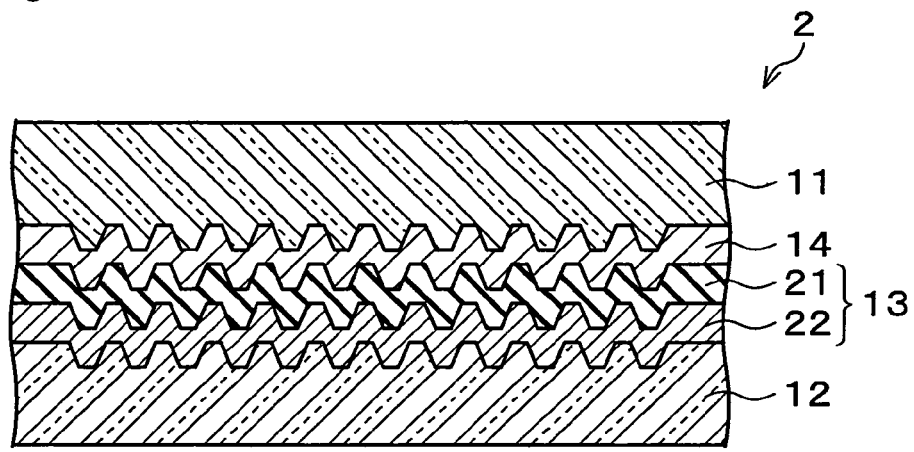
FIG. 9 is a partial cross sectional view showing an essential portion of an optical information recording medium according to another embodiment of the present invention.
Figure 10:
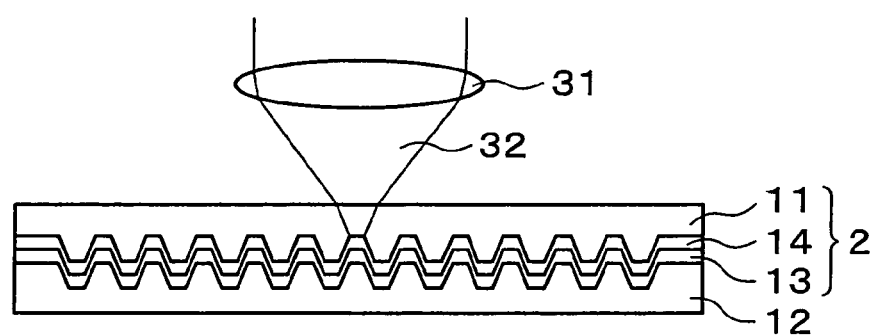
FIG. 10 is a cross sectional view schematically showing the optical information recording medium shown in FIG. 9.

As shown in FIG. 9 and FIG. 10, the optical information recording medium according to the present embodiment is a recording/reproducing (recordable or rewritable) optical information recording medium 2, and includes: a transparent resin layer 11; a recording layer 14; a temperature responsive reflection layer 13; and a substrate 12, these members being formed in this order from a side receiving a recording/reproducing beam 32 serving as a recording/reproducing light beam. The temperature responsive reflection layer 13 is arranged in the same manner as in Embodiment 1, and the temperature responsive layer 21 and the reflection layer 22 are laminated in this order from the side receiving the recording/reproducing beam 32 (from the side of the transparent resin layer 11).

The recording layer 14 can be made of recording material generally used in the field to which the present invention pertains. For example, in case where the optical information recording medium 2 is arranged as a recordable medium, it is possible to use organic dyes such as cyanine, phthalocyanine, and the like.

Further, in case where the optical information recording medium 2 is arranged as a rewritable (recording/reproducing erasure) medium, it is possible to use: magneto-optical materials such as TbFeCo and the like; and phase change recording materials such as AgInSbTe, GeTeSb, AgInSb, and the like. In case of using the magneto-optical materials such as TbFeCo and the like, the recording layer 14 is arranged so as to have a layered structure constituted of three layers, e.g., (i) an inductive material layer made of inductive material such as SiN (silicon nitride) or the like, (ii) a recording layer made of magneto-optical recording material, and (iii) a protective layer made of protective material such as SiN or the like.

Further, in case of using the phase change recording materials such as AgInSbTe, GeTeSb, AgInSb, and the like, the recording layer 14 is arranged so as to have a layered structure constituted of three layers, e.g., (i) an inductive material layer such as $ZnS.SiO_2$ layer or the like, (ii) a recording layer made of phase change recording materials such as AgInSbTe, GeTeSb, AgInSb, and the like, and (iii) a protective layer such as $ZnS.SiO_2$ layer or the like. The thickness of the recording layer 14 is not particularly limited, but it is appropriate that the thickness of the recording layer 14 ranges from 5 nm to 500 nm for example.

As in Embodiment 1, the substrate 12 can be made of any material as long as it is possible to give the optical information recording medium 1 an appropriate strength, and the substrate 12 may be transparent or may be opaque. As a material constituting the substrate 12, it is possible to use the aforementioned material. The thickness of the substrate 12 is not particularly limited, but it is appropriate that the thickness of the substrate 12 ranges from 0.1 mm to 1.2 mm for example. Note that, in the present embodiment, a flat substrate may be used instead of the substrate 12 having the pit and the groove.

The transparent resin layer 11 and the temperature responsive reflection layer 13 are arranged in the same manner as in Embodiment 1 except that the recording layer 14 intervenes therebetween.

Further, the optical information recording medium 2 according to the present embodiment may be arranged so that the reflection layer 22 is omitted from the temperature responsive layer 21 and the reflection layer 22 of the temperature responsive reflection layer 13 for the reason explained in Embodiment 1. Further, the optical information recording medium 2 according to the present embodiment is arranged so that the recording layer 14 is positioned on the light beam irradiating side of the temperature responsive reflection layer 13, but the technical idea of the present invention is not limited to this positional relation. Specifically, the technical idea of the present invention includes: an arrangement in which the temperature responsive layer 21 and the reflection layer 22 of the temperature responsive reflection layer 13 are separated from each other so as to provide the temperature responsive layer 21, the recording layer 14, and the reflection layer 22 in this order from the beam irradiating side; and an arrangement in which the recording layer 14 functions also as the reflection layer so as to omit the reflection layer 22, i.e., an arrangement in which the temperature responsive layer 21 and the recording layer 14 are positioned in this order from the beam irradiating side.

According to the arrangement, it is possible to realize the optical information recording medium, having a writable recording medium, such as so-called CD-R (Compact Disc Recordable), CD-RW (Compact Disc ReWritable), DVD-R (Digital Versatile Disc Recordable), DVD-RW (Digital Versatile Disc ReWritable), DVD-RAM (Digital Versatile Disc Random Access Memory), MO (Magneto-optical disc), and the like.

Further, in the optical information recording medium 2, it is possible to reproduce information in the same manner as in the optical information recording medium 1 of Embodiment 1. That is, as shown in FIG. 10, the optical information recording medium 2 is arranged so that: a laser light source such as a semiconductor laser 121 shown in FIG. 11 and an optical system such as a light collecting lens 131 or the like corresponding to an objective lens 125 shown in FIG. 11 are used to transmit the recording/reproducing beam 32 from the side of the transparent resin layer 11 to the recording layer 14. At this time, the light beam is irradiated so that a high temperature portion and a low temperature portion occur in the light beam spot of the temperature responsive layer 21 so as to drop the transmissivity in the high temperature portion of the temperature responsive layer 21. Further, the light reflected by the recording layer 14 is detected by an optical head (not shown), thereby reproducing information in accordance with the light transmitted through the low temperature portion of the temperature responsive layer 21.

In the optical information recording medium 2, the temperature responsive reflection layer 13 is provided on the rear surface (rear surface with respect to a surface to which the recording/reproducing beam 32 is irradiated) of the recording layer 14 in view of the incident light. Thus, when the recording/reproducing beam 32 is guided to a guiding groove of the transparent substrate at the time of reproduction, the recording/reproducing beam 32 enters the temperature responsive reflection layer 13 via the recording layer 14. The recording/reproducing beam 32 enters the temperature responsive reflection layer 13 in this manner, so that the temperature of the temperature responsive reflection layer 13 rises as described above, and the high temperature portion 33a occurs in a rear side direction and the low temperature portion 33b occurs in a front side direction with respect to a moving direction of the recording/reproducing beam spot 33 as shown in FIG. 3(b).

The temperature responsive reflection layer 13 has such a property that the reflectance drops in response to the temperature rise, so that the high temperature portion is in a low reflectance state and the lower temperature portion is in a high reflectance state. Thus, it is possible to reproduce information, recorded in the recording layer 14, by an opening section (low temperature portion) equal to or smaller than an optical spatial resolution (diffraction limit of the reproduction beam), so that it is possible to reproduce information, recorded in a high density manner, with high quality. In this manner, in the optical information recording medium of the present embodiment, the temperature responsive layer 21 is used to reproduce a minute recording mark which is recorded in the recording layer 14 and is equal to or smaller than a diffraction limit of the reproduction beam.

Further, the thickness and the refraction of each layer are designed, so that it is possible to facilitate the temperature rise in the temperature responsive layer 21 by utilizing optical interference. Particularly, it is effective to design the optical interference state by adjusting the thickness and the refraction of the temperature responsive layer 21 which is substantially transparent. As a result, it is possible to reproduce information with lower laser power, so that it is possible to realize the optical information recording medium whose reproduction sensitivity is high.

Further, as in Embodiment 1, the optical information recording medium 2 according to the present embodiment uses the temperature responsive layer 21 for dropping the transmissivity of the high temperature portion 33a, so that the temperature responsive layer 21 can be made of material such as metal oxide or the like which does not melt even when the temperature rises at the time of recording or reproduction. Therefore, even when information is repeatedly recorded and reproduced, the mask effect does not drop and high durability can be obtained.

A recording method is not particularly limited, but the following method is preferable. That is, in recording information, the recording/reproducing beam 32 is irradiated to the optical information recording medium 2 with higher laser power than laser power at the time of reproduction so as to heat the recording layer 14. Further, the light beam is irradiated so that a high temperature portion and a low temperature portion occur in the light beam spot of the temperature responsive layer 21, so that the transmissivity of the high temperature portion of the temperature responsive layer 21 is dropped and a minute region of the recording layer 14 is selectively heated by light transmitted through the low temperature portion of the temperature responsive layer 21. Thus, information can be recorded on the minute region of the recording layer 14, so that it is possible to realize the high density recording.

Note that, in each of the aforementioned embodiments, the transmissivity of the temperature responsive layer 21 in the reproduction beam wavelength drops in response to the temperature rise. However, even in the temperature responsive layer 21, the transmissivity is not necessarily dropped by the temperature rise depending on how the reproduction beam wavelength is set. That is, in case of the temperature responsive layer 21 having the transmissivity properties shown in FIG. 4 to FIG. 6, the transmissivity in the wavelength of 408 nm drops at a high temperature. However, in case where the reproduction beam wavelength is set to be larger, the transmissivity rises at a high temperature. The present invention is effective also in case where the reproduction beam wavelength is set so that the transmissivity rises at a high temperature in this manner. In other words, the temperature responsive layer 21 may be arranged so that the transmissivity in the reproduction beam wavelength rises in response to the temperature rise.

In the optical information recording mediums 1 and 2 arranged so that the transmissivity of the temperature responsive layer 21 in the reproduction beam wavelength rises in response to the temperature rise, the light beam is irradiated so that a high temperature portion and a low temperature portion occur in the light beam spot of the temperature responsive layer 21, and the transmissivity at the high temperature portion of the temperature responsive layer 21 is raised, and the light reflected by the recording layer 14 is detected by an optical head, thereby reproducing information in accordance with the light transmitted through the high temperature portion of the temperature responsive layer 21.

Further, in recording information on the optical information recording medium 2 arranged so that the transmissivity of the temperature responsive layer 21 in the recording/reproducing beam wavelength rises in response to the temperature rise, the light beam is irradiated so that a high temperature portion and a low temperature portion occur in the light beam spot of the temperature responsive layer 21, and the transmissivity at the high temperature portion of the temperature responsive layer 21 is raised, and a minute region of the recording layer 14 is selectively heated by the light transmitted through the high temperature portion of the temperature responsive layer 21.

Thus, the method of the present invention for reproducing information from the optical information recording medium is also arranged so that: the light beam is irradiated to the optical information recording medium so that a high temperature portion and a low temperature portion are formed within a light beam spot of the temperature responsive layer so as to drop the transmissivity at the high temperature portion of the temperature responsive layer, and the recording layer is heated by light transmitted through the low temperature portion of the temperature responsive layer.

Further, the method of the present invention for reproducing information from the optical information recording medium is also arranged so that: the light beam is irradiated to the optical information recording medium so that a high temperature portion and a low temperature portion are formed within a light beam spot of the temperature responsive layer, and the transmissivity at the low temperature portion of the temperature responsive layer is dropped, and information is reproduced in accordance with light transmitted through the high temperature portion of the temperature responsive layer.

According to the foregoing method, information is reproduced in accordance with the light transmitted through the low temperature portion of the temperature responsive layer, so that it is possible to selectively reproduce information at a region whose size is smaller than the spot size of the reproducing light beam. As a result, it is possible to surely reproduce information from the optical information recording medium, in which information has been recorded in a high density manner, with high accuracy.

Further, the method of the present invention for recording information in the optical information recording medium is also arranged so that: the light beam is irradiated to the optical information recording medium so that a high temperature portion and a low temperature portion are formed within a light beam spot of the temperature responsive layer so as to drop the transmissivity at the high temperature portion of the temperature responsive layer, and the recording layer is heated by light transmitted through the low temperature portion of the temperature responsive layer.

Further, the method of the present invention for recording information in the optical information recording medium is also arranged so that: the light beam is irradiated to the optical information recording medium so that a high temperature portion and a low temperature portion are formed within a light beam spot of the temperature responsive layer so as to drop the transmissivity at the low temperature portion of the temperature responsive layer, and the recording layer is heated by light transmitted through the high temperature portion of the temperature responsive layer.

According to the foregoing method, the recording layer is heated by the light transmitted through the high temperature portion of the temperature responsive layer, so that it is possible to selectively record information at a region whose size is smaller than the spot size of the recording light beam. As a result, it is possible to surely record information in the recording layer in a high density manner with high accuracy.

Further, in the optical information recording medium 2, the temperature responsive layer 21 is provided on the rear surface with respect to the light beam receiving surface of the recording layer 14. However, the temperature responsive layer 21 may be provided on the recording/reproducing beam 32 receiving surface of the recording layer. In this case, the reproduction sensitivity is lower than that of the optical information recording medium 2, but it is possible to realize a medium whose durability is higher than that of arrangements in Patent Documents 1 and 2.

Further, the optical information recording medium of the present invention may be arranged so that: the recording layer 14 is laminated on the optical information recording medium 2 so as to be positioned in the light receiving side of the temperature responsive reflection layer 13, that is, so as to be positioned between the substrate 23 and the temperature responsive reflection layer 13.

Note that, the present invention is not limited to the foregoing embodiments, but may be varied within the scope of the following claims. For example, the optical information recording medium of the present invention may be not only a so-called plate-shaped optical disc but also a card-shaped or sheet-shaped optical disc.

Further, in the optical information recording medium of the present invention, a mode in which the optical information is recorded is not particularly limited as long as the mode is an optical mode, but various optical information recording mediums such as a magneto-optical disc, a phase change optical disc, and the like can be used as the optical information recording medium of the present invention.

Further, the optical information recording medium of the present invention may be arranged so that: lamination of the layered structure of Embodiment 1 or Embodiment 3 is repeated. For example, the temperature responsive reflection layer 13 is formed or the temperature responsive reflection layer 13 and the recording layer 14 are formed on each of two substrates, and these substrates are connected to each other so that the temperature responsive reflection layers 13 or the recording layers 14 are opposite to each other, so as to irradiate light from sides of both substrates.

Further, the technical scope of the present invention includes an embodiment obtained by suitably combining technical means disclosed in different embodiments. For example, the optical information recording medium of the present invention may be arranged as a hybrid medium which includes: a playback-only surface having the same layered structure as in Embodiment 1; and a recording/reproducing surface having the same layered structure as in Embodiment 2, the playback-only surface and the recording/reproducing surface being provided in a mixed manner.

(1) In order to achieve the foregoing object, the optical information recording medium of the present invention, which stores information reproduced by irradiation of a light beam (wavelength=$\lambda r$ (nm)), includes: a substrate on which a pit and/or groove corresponding to the information is formed; and a temperature responsive layer whose optical property in the wavelength $\lambda r$ of the light beam changes in response to temperature rise caused by the irradiation of the light beam, wherein $\lambda r-100<\lambda a<\lambda r$ where an optical absorption edge wavelength of the temperature responsive layer is $\lambda a$ (nm).

The condition indicated by $\lambda r-100<\lambda a<\lambda r$ was found from (i) such observation that: the super-resolution reproduction phenomenon was not confirmed in red laser ($\lambda r=650$ nm), but the super-resolution reproduction phenomenon was confirmed only in blue laser ($\lambda=405$ nm or 408 nm) and (ii) such observation that: as to a material in which the optical absorption edge wavelength $\lambda a$ and the light beam wavelength $\lambda r$ greatly deviate from each other, the super-resolution reproduction phenomenon was not confirmed also in blue laser.

In the foregoing arrangement, the optical absorption edge means photon energy of a band gap between a valence band and a conduction electron band, and a wavelength corresponding to the photon energy of the optical absorption edge is referred to as an optical absorption edge wavelength.

According to the foregoing arrangement, when a playback-only light beam is irradiated, in the temperature responsive layer, the optical property in the light beam wavelength, e.g., transmissivity changes (drops or rises) at a portion whose temperature has risen due to the irradiation of the light beam, and the optical property is kept at other portion whose temperature does not rise and remains low. On this account, according to the foregoing arrangement, it is possible to selectively reproduce information at a region whose size is smaller than a spot size of the playback-only light beam.

As a result, the foregoing arrangement realizes the optical information recording medium which can surely reproduce information, having been recorded in a high density manner, with high accuracy, so that it is possible to read out information, with a high signal intensity property, on the basis of a pit or the like smaller than an optical system reading spot size which cannot be read out by a conventional method using no temperature responsive layer.

Further, according to the foregoing arrangement, $\lambda r-100<\lambda a<\lambda r$, so that the wavelength of the light beam is larger than the optical absorption edge wavelength, and the optical absorption edge wavelength and the wavelength of the light beam are in proximity to each other, so that the wavelength dependency (hereinafter, referred to as a transmissivity spectrum) of the transmissivity indicative of the optical property drastically changes in the vicinity of the light beam wavelength. Thus, in the foregoing arrangement, when the optical absorption edge shifts to the large wavelength side or the small wavelength side due to the temperature rise, the transmissivity spectrum drastically changes in the vicinity of the light beam wavelength. Thus, even when the optical absorption edge slightly shifts, the optical property (transmissivity) greatly changes. That is, in the foregoing arrangement, the optical property (transmissivity) more greatly changes than the optical absorption edge shifts, so that it is possible to enhance the foregoing effect.

Note that, the material and/or the thickness of the temperature responsive layer is selected so that $\lambda r-100<\lambda a<\lambda r$.

(2) Further, in order to achieve the foregoing object, the optical information recording medium of the present invention includes a recording layer for optically recording information, and the information is reproduced by irradiation of a light beam (wavelength=$\lambda r$ (nm)), and the optical information recording medium includes a temperature responsive layer whose optical property in the wavelength $\lambda r$ of the light beam changes in response to temperature rise caused by the irradiation of the light beam, wherein $\lambda r-100<\lambda a<\lambda r$ where an optical absorption edge wavelength of the temperature responsive layer is $\lambda a$ (nm).

According to the foregoing arrangement, when a recording light beam is irradiated, in the temperature responsive layer, the optical property in the light beam wavelength, e.g., transmissivity changes (drops or rises) at a portion whose temperature has risen due to the irradiation of the light beam, and the optical property is kept at other portion whose temperature does not rise and remains low. On this account, according to the foregoing arrangement, it is possible to selectively record information at a region whose size is smaller than a spot size of the recording light beam. As a result, the foregoing arrangement realizes the optical information recording medium which can surely record information, in a high density manner, with high accuracy, unlike the optical information recording medium having no temperature responsive layer.

Further, according to the foregoing arrangement, in case where information has been recorded in the recording layer, as in the previous arrangement, it is possible to selectively reproduce the information at a region whose size is smaller than a spot size of the reproducing light beam that has been irradiated. As a result, unlike the optical information recording medium having no temperature responsive layer, it is possible to provide the optical information recording medium which can surely reproduce information, which has been recorded in a high density manner, with high accuracy.

Further, under the condition indicated by $\lambda r-100<\lambda a<\lambda r$, the light beam wavelength is larger than the optical absorption edge wavelength, and the optical absorption edge wavelength and the light beam wavelength are in proximity to each other. Thus, the transmissivity spectrum in the light beam wavelength drastically changes. Thus, in the foregoing arrangement, in case where the optical absorption edge shifts to the large wavelength side or the small wavelength side due to the temperature rise, the optical property (transmissivity) greatly changes even when the optical absorption edge slightly shifts. That is, in the foregoing arrangement, the optical property (transmissivity) more greatly changes than the optical absorption edge shifts, so that it is possible to enhance the foregoing effect.

The optical information recording medium of the present invention may be arranged so that the optical property of the temperature responsive layer is transmissivity. According to this arrangement, it is easy to confirm the optical property of the temperature responsive layer, and it is easy to design the medium.

In the optical information recording medium of the present invention, it is preferable that $\lambda a$ (nm) indicative of the optical absorption edge wavelength of the temperature responsive layer is under such condition that $305<\lambda a<405$. According to this arrangement, laser devices used in actual optical recoding, particularly, in general products are manufactured mainly as mass production, so that wavelengths thereof are likely to have substantially a specific value, e.g., a value in the vicinity of 405 nm in case of blue-violet laser, having a short wavelength, which is advantageous for higher density. Thus, it is advantageous to realize the foregoing condition when using the present invention in a general high-density device.

Further, in the optical information recording medium of the present invention, it is preferable that a thickness of the temperature responsive layer ranges from 100 nm to 300 nm. According to this arrangement, it is possible to more efficiently utilize multiple interference, so that it is possible to enhance the optical property change caused by the temperature rise. While, it is possible to prevent deposition from making the layer surface blunter than the bumpy shape of the substrate, so that the foregoing thickness results in advantage in terms of a process and cost.

Further, in the optical information recording medium of the present invention, it is preferable that a reflectance in the wavelength of the light beam having been irradiated drops in response to the temperature rise. According to this arrangement, it is easy to confirm the optical property of the optical information recording medium, and it is easy to design the medium.

(3) Further, the temperature responsive layer of the optical information recording medium of the present invention is arranged so that: in the temperature responsive layer, a condition under which a transmissivity property indicative of the optical property changes in response to a temperature is controlled on the basis of optical interference between reflected light on one side and reflected light on an other side.

According to the foregoing arrangement, the reflectance is changed due to a temperature of the temperature responsive layer and optical interference is brought about between reflected light on one side and reflected light on an other side, and the condition under which the transmissivity property changes in response to the temperature is controlled in accordance with the optical interference, thereby increasing the transmissivity change (modulation degree) due to the temperature rise.

This is based on the following reason: The optical interference effect is completed only by the temperature responsive layer unlike the case where the transparent layer for repetitively reflecting light is provided on a portion other than the temperature responsive layer, so that it is possible to enhance the optical absorption in the temperature responsive layer, thereby efficiently raising the temperature of the temperature responsive layer. As a result, it is possible to enhance the masking effect of the temperature responsive layer, so that it is possible to more surely reproduce information with a diameter smaller than a spot diameter of the irradiated light beam with high accuracy.

Note that, each of the one side and the other side of the temperature responsive layer faces any one of the thin layer, the substrate, and an airspace which are different from each other in terms of a refraction, so that each of the one side and the other side of the temperature responsive layer serves as an interface for reflection.

(4) Further, the temperature responsive layer of the optical information recording medium of the present invention is arranged so that: in the temperature responsive layer, the optical absorption edge wavelength shifts to a large wavelength side in response to the temperature rise, and a transmissivity indicative of the optical property in the wavelength of the light beam having been irradiated drops in response to the temperature rise.

In Patent Document 1, the mask layer for raising the transmissivity at the high temperature portion improves the reproduction resolution. In contrast, according to the foregoing arrangement, the transmissivity in a highly heated portion of the temperature responsive layer is dropped, thereby improving the reproduction resolution.

As described above, when information is repeatedly recorded and reproduced, the mask effect of the mask layer disclosed in each of Patent Documents 1 and 2 drops. In contrast, according to the arrangement of the present invention, the temperature responsive layer in which the transmissivity at the high temperature portion drops is used. The temperature responsive layer can be made of material such as metal oxide which does not melt when the temperature rises upon recording or reproducing information, so that the mask effect does not drop even when information is repeatedly recorded and reproduced. Thus, it is possible to provide the optical information recording medium which is superior in durability.

(5). Further, the temperature responsive layer of the optical information recording medium of the present invention is arranged so that: the temperature responsive layer includes a metal oxide compound whose transmissivity indicative of the optical property in the wavelength of the light beam having been irradiated drops in response to the temperature rise.

According to the foregoing arrangement, the temperature responsive layer whose transmissivity at the high temperature portion drops is used. The temperature responsive layer can be made of material such as metal oxide which does not melt when the temperature rises upon recording or reproducing information, so that the mask effect does not drop even when information is repeatedly recorded and reproduced. Thus, it is possible to provide the optical information recording medium which is superior in durability.

(6) Further, the optical information recording medium of the present invention is arranged so that the temperature responsive layer includes zinc oxide.

According to the foregoing arrangement, zinc oxide of the temperature responsive layer is substantially transparent in an initial state, and optical interference can be effectively utilized, so that it is possible to effectively obtain the foregoing effect, and the temperature responsive layer is made of inorganic metal oxide, so that it is possible to secure the durability as in the previous arrangement. Further, the optical absorption edge wavelength is in the vicinity of the light beam wavelength, and the transmissivity spectrum in the light beam wavelength greatly changes. Thus, the optical absorption edge shifts with the temperature rise, so that the transmissivity more greatly changes, thereby enhancing the aforementioned super-resolution reproduction effect.

Note that, zinc oxide has such a property that: at a high temperature, shift of the absorption edge causes the transmissivity spectrum to shift to the large wavelength side, so that the transmissivity drops, which results in a smaller reflectance as a disc. Thus, it is so arranged that: a portion whose temperature has risen is masked, and information is reproduced from a portion whose temperature did not change. However, a real part n of the refraction changes in response to a temperature, so that an arrangement adverse to the foregoing arrangement is possible by adjusting an optical multiple interference state with adjustment of the layer thickness. That is, it can be so arranged that: the reflectance as a disc is raised at apportion whose temperature has risen, and information is reproduced from the portion whose temperature has risen. It was confirmed that: both the modes are adverse to each other in terms of (i) a condition under which the reflectance of the disc changes in response to a temperature and (ii) a region from which a pit equal to or smaller than the diffraction limit is read out, but both the modes allow a mark equal to or smaller than the diffraction limit to be read, thereby realizing the super-resolution reproduction effect.

(7) Further, the optical information recording medium of the present invention is arranged so as to further includes: a reflection layer for reflecting the light beam, wherein: the temperature responsive layer has a first surface on which the light beam is incident and a second surface opposite to the first surface, and the reflection layer is formed above the second surface.

According to the foregoing arrangement, it is possible to efficiently reflect the light beam to the temperature responsive layer, so that the optical interference effect of the temperature responsive layer is enhanced. Further, this arrangement is advantageous also in obtaining reflected light converted into an electric signal for reproduction and super-resolution reproduction.

(8) Further, the optical information recording medium of the present invention is arranged so that: there is provided a transparent protective layer which is made of inorganic material and is positioned adjacent to either or both of surfaces of the reflection layer.

According to the foregoing arrangement, it is possible to make the reflection layer thinner by providing the protective layer, so that the transmissivity does not drop even when the optical information recording medium is multi-layered. Further, even when the temperature rises due to irradiation of the light beam, it is possible to prevent deterioration such as heat damage or oxidization of the reflection layer, thereby improving the durability of the optical information recording medium.

Further, it is preferable to arrange the optical information recording medium of the present invention so that: the transparent protective layer is made of material whose heat conductivity is lower than a heat conductivity of the reflection layer. According to the foregoing arrangement, the protective layer prevents heat from being released from the temperature responsive layer to the reflection layer whose heat conductivity is high, so as to function as a heat insulating layer, thereby enhancing the temperature rise of the temperature responsive layer.

(9) The optical information recording medium of the present invention is arranged so that: the reflection layer is made of material selected from Al, Ag, Au, Cu, Si, and Ge, or made of alloy containing the material.

According to the foregoing arrangement, it is possible to obtain sufficient reflected light due to reproduction and super-resolution reproduction. Further, this allows the optical interference to be more effectively utilized. Thus, it is possible to enhance the super-resolution reproduction effect.

(10) Further, the optical information recording medium of the present invention is arranged so that: the transparent protective layer made of inorganic material is constituted of any one of nitride, sulfide, oxide, and fluoride, or a mixture thereof.

According to the foregoing arrangement, the protective layer is transparent, and is an inorganic material, and has high heat resistance, and hardly allows oxygen to permeate, and prevents oxidization, so that the reflection layer is further hardly damaged and further hardly oxidized. This improves the durability of the medium.

(11) Further, the optical information recording medium of the present invention is arranged so that: the temperature responsive layer has a first portion whose transmissivity is high and a second portion whose transmissivity is low, the first portion and the second portion being formed within a range of an irradiation spot of the light beam in accordance with temperature distribution caused by the irradiation of the light beam.

According to the foregoing arrangement, it is possible to obtain a reproduction signal based on reflected light which occurs at the first portion whose transmissivity is high, so that it is possible to reproduce a minute recording mark equal to or smaller than the diffraction limit of a reproducing light beam which cannot be reproduced by a general arrangement. Thus, it is possible to raise the recording density with a simple arrangement.

Further, it is preferable to arrange the optical information recording medium of the present invention so that: a temperature of the first portion formed on the temperature responsive layer is lower than a temperature of the second portion formed on the temperature responsive layer.

According to the foregoing arrangement, it is possible to utilize the transmissivity change corresponding to the shift of the optical absorption edge of the temperature responsive layer so as to realize the super-resolution reproduction. Thus, according to the foregoing arrangement, it is possible to obtain a reproduction signal based on reflected light which occurs at the first portion whose transmissivity is high at a low temperature, so that it is possible to reproduce a minute recording mark equal to or smaller than the diffraction limit of a reproducing light beam which cannot be reproduced by a general arrangement. Thus, it is possible to raise the recording density with a simple arrangement.

(12) A reproduction method of the present invention which uses any one of the aforementioned optical information recording mediums includes the steps of: irradiating the light beam, whose wavelength $\lambda r$ is under such condition that $\lambda r-100 < \lambda a < \lambda r$, to the optical information recording medium; forming a first portion whose transmissivity is high and a second portion whose transmissivity is low within a range of an irradiation spot of the light beam so as to correspond to a temperature change in the irradiation spot of the temperature responsive layer; and reproducing a minute recording mark, equal to or smaller than a diffraction limit of a reproducing light beam, from the first portion whose transmissivity is high.

According to the foregoing method, it is possible to reproduce a minute recording mark equal to or smaller than the diffraction limit of a reproducing light beam which cannot be reproduced by a general arrangement. Thus, it is possible to raise the recording density with a simple arrangement.

Note that, there is a case where the temperature responsive layer's portion whose temperature has been raised changes from the high transmissivity state to the low transmissivity state. Adversely, there is a case where the temperature responsive layer's portion whose temperature has been raised changes from the low transmissivity state to the high transmissivity state. The state changes depending on a relative change of the reflectance.

Thus, the foregoing method may be arranged so that: due to irradiation of the light beam, the temperature responsive layer's portion whose transmissivity has changed serves as a mask (the second portion) for the minute recording mark, and the temperature responsive layer's portion whose transmissivity did not change serves as a window (the firs portion) for reproducing the minute recording mark, thereby reproducing the minute recording mark equal to or smaller than the reproducing light beam. Adversely, it may be so arranged that: the temperature responsive layer's portion whose transmissivity did not change serves as a mask (the second portion) for the minute recording mark, and the temperature responsive layer's portion whose transmissivity has changed serves as a window (the first portion) for reproducing the minute recording mark, thereby reproducing the minute recording mark equal to or smaller than the reproducing light beam.

(13) An optical information processing device of the present invention uses any one of the aforementioned optical information recording mediums and any one of the aforementioned methods for reproducing information from the optical information recording medium, so as to reproduce information from the optical information recording medium.

According to the device, it is possible to cause substantially the same arrangement as a conventional device to reproduce or record information from or in the optical information recording medium in a high density manner without increasing the cost.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. An optical information recording medium storing information reproduced by irradiation of a light beam (wavelength=$\lambda r$ (nm)), comprising:
   a substrate on which a pit and/or groove corresponding to the information is formed;
   a temperature responsive layer made of a metal oxide compound, having a first surface on which the light beam is incident and a second surface opposite to the first surface, an optical property of the temperature responsive layer in the wavelength $\lambda r$ of the light beam-changing in response to a temperature rise caused by the irradiation of the light beam; and
   a reflection layer, positioned above the second surface of said temperature responsive layer, for reflecting the light beam to the temperature responsive layer, wherein
   $\lambda r-100 < \lambda a < \lambda r$ where an optical absorption edge wavelength of the temperature responsive layer is $\lambda a$ (nm),
   the optical absorption edge wavelength is a wavelength corresponding to a band gap of the temperature responsive layer,
   the reflection layer includes an Al layer whose thickness is not less than 15 nm and less than 30 nm and first and second transparent protective layers each made of inorganic material, the first and second transparent protective layers being adjacent to both surfaces of the Al layer, respectively, and
   wherein the temperature responsive layer has a thickness in the range from 100 nm to 300 nm, and has a transmissivity indicative of a drop in said optical property of the temperature responsive layer in the wavelength of the light beam having been irradiated in response to a temperature rise.

2. The optical information recording medium as set forth in claim 1, wherein $\lambda a$ (nm) indicative of the optical absorption edge wavelength of the temperature responsive layer is under such condition that $305 < \lambda a < 405$.

3. The optical information recording medium as set forth in claim 1, wherein a thickness of the temperature responsive layer ranges from 120 nm to 300 nm.

4. The optical information recording medium as set forth in claim 1, wherein a reflectance in the wavelength of the light beam having been irradiated drops in response to the temperature rise.

5. The optical information recording medium as set forth in claim 1, wherein: in the temperature responsive layer, a condition under which a transmissivity property indicative of the optical property changes in response to a temperature is controlled on the basis of optical interference between reflected light on one side and reflected light on an other side.

6. The optical information recording medium as set forth in claim 1, wherein: in the temperature responsive layer, the optical absorption edge wavelength shifts to a large wavelength side in response to the temperature rise, and a transmissivity indicative of the optical property in the wavelength of the light beam having been irradiated drops in response to the temperature rise.

7. The optical information recording medium as set forth in claim 1, wherein the temperature responsive layer includes zinc oxide.

8. The optical information recording medium as set forth in claim 1, wherein the transparent protective layer is made of material whose heat conductivity is lower than a heat conductivity of the reflection layer.

9. The optical information recording medium as set forth in claim 1, wherein the transparent protective layer made of inorganic material is constituted of any one of nitride, sulfide, oxide, and fluoride, or a mixture thereof.

10. The optical information recording medium as set forth in claim 1, wherein the temperature responsive layer has a first portion whose transmissivity is high and a second portion whose transmissivity is low, the first portion and the second portion being formed within a range of an irradiation spot of the light beam in accordance with temperature distribution caused by the irradiation of the light beam.

11. The optical information recording medium as set forth in claim 10, wherein a temperature of the first portion formed on the temperature responsive layer is lower than a temperature of the second portion formed on the temperature responsive layer.

* * * * *